(12) United States Patent
Kumar et al.

(10) Patent No.: US 11,812,340 B2
(45) Date of Patent: Nov. 7, 2023

(54) USER EQUIPMENT OPERATION REGARDING POSITIONING IN SPLIT BEARER MODE

(71) Applicant: QUALCOMM Incorporated, San Diego, CA (US)

(72) Inventors: Akash Kumar, Hyderabad (IN); Amit Jain, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 128 days.

(21) Appl. No.: 17/494,711

(22) Filed: Oct. 5, 2021

(65) Prior Publication Data

US 2022/0124459 A1    Apr. 21, 2022

Related U.S. Application Data

(60) Provisional application No. 63/092,243, filed on Oct. 15, 2020.

(51) Int. Cl.
*H04W 4/029* (2018.01)
*H04W 76/15* (2018.01)

(52) U.S. Cl.
CPC .......... *H04W 4/029* (2018.02); *H04W 76/15* (2018.02)

(58) Field of Classification Search
None
See application file for complete search history.

(56) References Cited

U.S. PATENT DOCUMENTS

| 2019/0357196 A1* | 11/2019 | Majmundar | H04L 49/3072 |
| 2021/0067409 A1* | 3/2021 | Byun | H04W 28/0252 |
| 2022/0007443 A1* | 1/2022 | Xu | H04W 28/18 |
| 2022/0030654 A1* | 1/2022 | Yang | H04W 76/11 |

FOREIGN PATENT DOCUMENTS

| CN | 111182584 A | 5/2020 |
| EP | 3713259 A1 | 9/2020 |

OTHER PUBLICATIONS

International Search Report and Written Opinion—PCT/US2021/053786—ISA/EPO—dated Jan. 31, 2022.

* cited by examiner

*Primary Examiner* — German Viana Di Prisco
(74) *Attorney, Agent, or Firm* — Procopio, Cory, Hargreaves & Savitch LLP

(57) ABSTRACT

A user equipment (UE) communicating with a first base station via a first radio bearer and a second bases station via a second radio bearer is disclosed. Uplink data transmissions using the radio bearers may be controlled by a threshold. During a positioning session to locate the UE, the UE may modify the threshold to cause the UE to use both the first radio bearer and the second radio bearer. The UE may return the threshold to an original value after the positioning session.

26 Claims, 12 Drawing Sheets

1000

```
Receive a first value for a threshold that describes an amount of
uplink data that, when exceeded, causes the UE to transmit excess
uplink data via the second radio bearer while the UE is in a split
bearer mode, wherein the UE is configured to communicate through
a first radio bearer and a second radio bearer while in the split bearer
mode.
1002
```

```
Set the threshold to a second value when operating in a positioning
session.
1004
```

*FIG. 10*

USER EQUIPMENT OPERATION REGARDING POSITIONING IN SPLIT BEARER MODE

CLAIM OF PRIORITY UNDER 35 U.S.C. § 119

This application claims under 35 USC § 119 the benefit of and priority to U.S. Provisional Application No. 63/092,243, filed Oct. 15, 2020, and entitled "USER EQUIPMENT OPERATION REGARDING POSITIONING IN SPLIT BEARER MODE," which is assigned to the assignee hereof and is incorporated herein by reference in its entirety.

BACKGROUND OF THE DISCLOSURE

1. Field of the Disclosure

Aspects of the disclosure relate generally to wireless communications and the like.

2. Description of the Related Art

Wireless communication systems have developed through various generations, including a first-generation analog wireless phone service (1G), a second-generation (2G) digital wireless phone service (including interim 2.5G networks), a third-generation (3G) high speed data, Internet-capable wireless service, and a fourth-generation (4G) service (e.g., Long-Term Evolution (LTE), WiMax). There are presently many different types of wireless communication systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) mobile standard calls for higher data transfer speeds, greater numbers of connections, and better coverage, among other improvements. The 5G standard (also referred to as "New Radio" or "NR"), according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G/LTE standard. Furthermore, signaling efficiencies should be enhanced and latency should be substantially reduced compared to current standards.

The UE may participate in a positioning session to determine the location of the UE. During the positioning session, the UE may transmit and/or receive positioning messages. The UE may suspend operations of one or more transceivers to conserve power. Accurate positioning information is desired even when operations of one or more transceivers are suspended.

SUMMARY

A wireless network including user equipment (UE) may communicate via a first base station using a 4G radio bearer and via a second base station using a 5G radio bearer. In some implementations, UL data transmissions may be controlled at least in part by a threshold that determines which radio bearers are used. The UE may modify the threshold during a positioning session to increase the accuracy of the positioning session.

In one implementation, a method performed by a user equipment (UE) for supporting a positioning session of the UE, the UE being a Dual Connectivity UE, includes receiving a first value for a threshold that describes an amount of uplink data that, when exceeded, causes the UE to transmit excess uplink data via the second radio bearer while the UE is in a split bearer mode, wherein the UE is configured to communicate through a first radio bearer and the second radio bearer while in the split bearer mode, and setting, by the UE, the threshold to a second value when operating in the positioning session.

In another implementation, a user equipment (UE) configured for supporting a positioning session of the UE, the UE being a Dual Connectivity UE may include a memory, a wireless transceiver, one or more processors operably coupled to the wireless transceiver and the memory, the one or more processors configured to receive, via the wireless transceiver, a first value for a threshold that describes an amount of uplink data that, when exceeded, causes the UE to transmit excess uplink data via the second radio bearer while the UE is in a split bearer mode, wherein the UE is configured to communicate through a first radio bearer and the second radio bearer while in the split bearer mode and set the threshold to a second value when operating in the positioning session.

In another implementation, medium including program code stored thereon, the program code is operable to configure at least one processor in a user equipment (UE) for supporting a positioning session of the UE, the UE being a Dual Connectivity UE, the program code comprising instructions to receive a first value for a threshold that describes an amount of uplink data that, when exceeded, causes the UE to transmit excess uplink data via the second radio bearer while the UE is in a split bearer mode, wherein the UE is configured to communicate through a first radio bearer and the second radio bearer while in the split bearer mode and set, by the UE, the threshold to a second value when the UE is operating in the positioning session.

In another implementation, a user equipment (UE) configured for supporting a positioning session of the UE, the UE being a Dual Connectivity UE, may include a means for receiving a first value for a threshold that describes an amount of uplink data that, when exceeded, causes the UE to transmit excess uplink data via the second radio bearer while the UE is in a split bearer mode, wherein he UE is configured to communicate through a first radio bearer and the second radio bearer while in the split bearer mode and means for setting the threshold to a second value when operating in the positioning session.

BRIEF DESCRIPTION OF THE DRAWINGS

The accompanying drawings are presented to aid in the description of various aspects of the disclosure and are provided solely for illustration of the aspects and not limitation thereof.

FIG. 10 shows a block diagram illustrating example features of a UE that is configured to perform positioning within a wireless network.

DETAILED DESCRIPTION

Figure 1A:
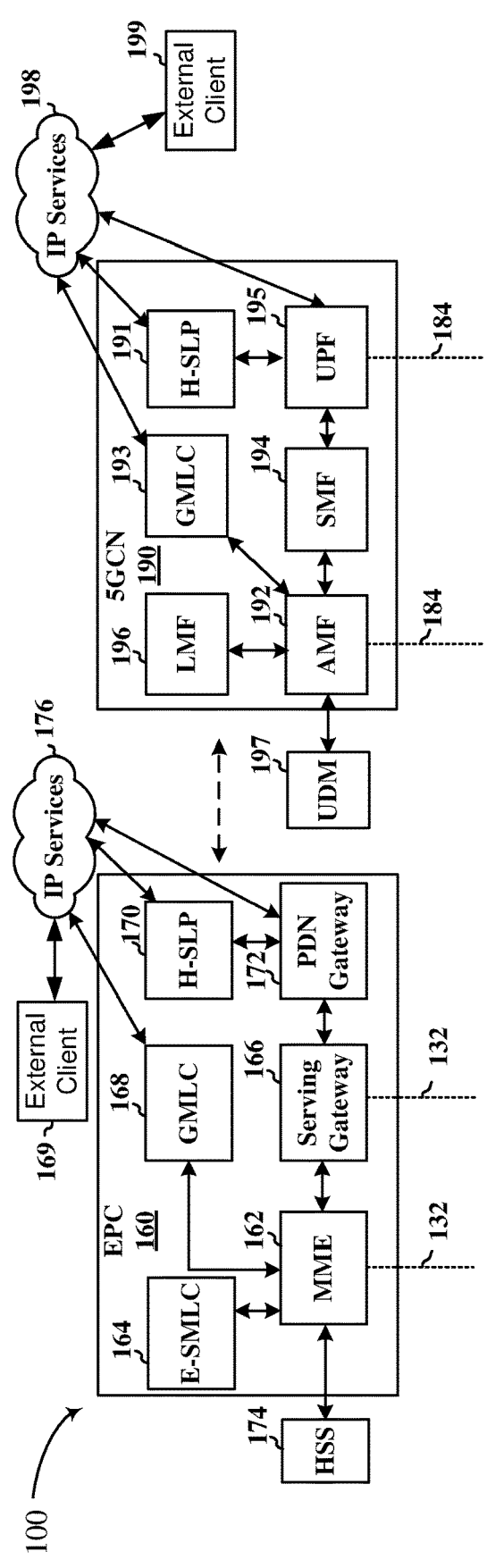
FIG. 1A shows a diagram of an example wireless network, according to various aspects of the disclosure. 100.
Figure 1A:
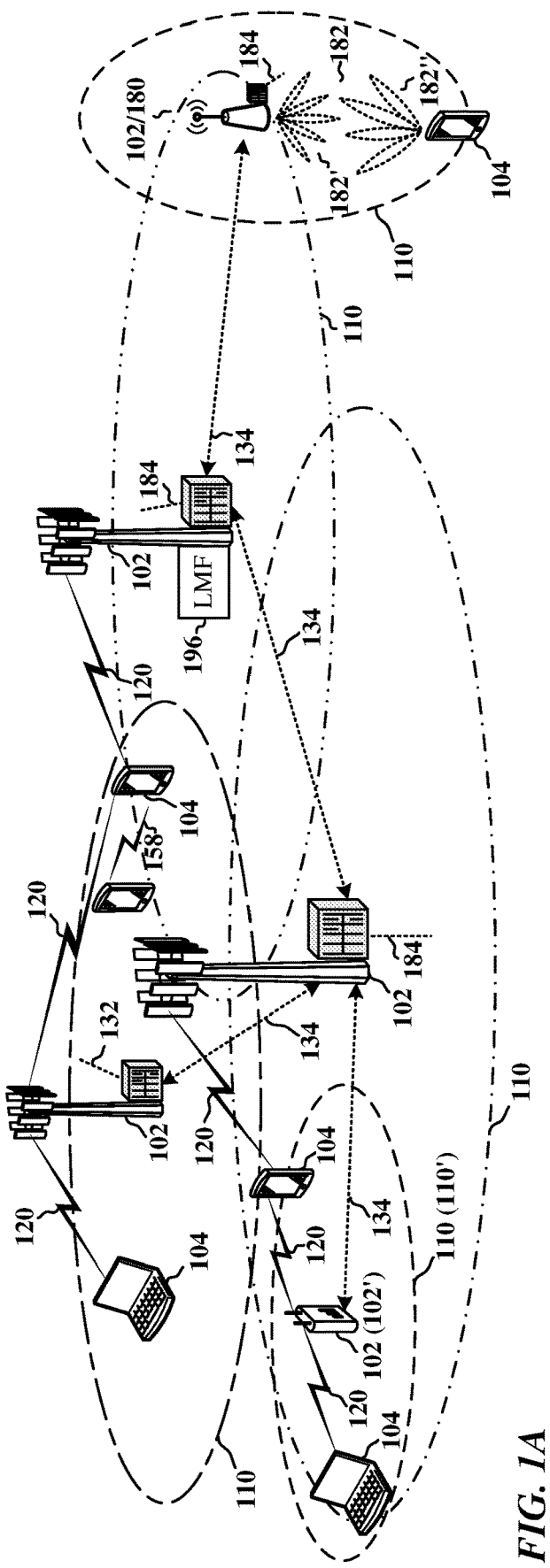

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular Radio Access Technology (RAT), unless otherwise noted. In general, a UE may be any wireless communication device (e.g., a mobile phone, router, tablet computer, laptop computer, consumer tracking device for tracking consumer items, packages, assets or entities such as individuals or pets, wearable (e.g., smartwatch, glasses, augmented reality (AR)/virtual reality (VR) headset, etc.), vehicle (e.g., automobile, motorcycle, bicycle, etc.), Internet of Things (IoT) device, etc.), sensors, instruments, and other devices networked together in industrial applications (Industrial Internet of Things (IIoT)), used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "wireless communication device", a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission point or to multiple physical transmission points that may or may not be co-located. For example, where the term "base station" refers to a single physical transmission point, the physical transmission point may be an antenna of the base station corresponding to a cell of the base station. Where the term "base station" refers to multiple co-located physical transmission points, the physical transmission points may be an array of antennas (e.g., as in a multiple-input multiple-output (MIMO) system or where the base station employs beamforming) of the base station. Where the term "base station" refers to multiple non-co-located physical transmission points, the physical transmission points may be a distributed antenna system (DAS) (a network of spatially separated antennas connected to a common source via a transport medium) or a remote radio head (RRH) (a remote base station connected to a serving base station). Alternatively, the non-co-located physical transmission points may be the serving base station receiving the measurement report from the UE and a neighbor base station whose reference RF signals the UE is measuring.

Various implementations relate generally to wireless positioning operations to determine the location of a UE with respect to one or more base stations that are within wireless communication range of the UE. A UE may be capable of operating as an Evolved-Universal Terrestrial Radio Access New Radio Dual Connectivity (ENDC) device where the UE may communicate using 4G and 5G technologies. In particular, some ENDC UEs may operate in a split bearer mode where the UE may transmit UL data concurrently via both the 4G and 5G radio bearers when the amount of UL data is greater than a threshold, such as the ul-DataSplitThreshold. When the amount of UL data is less than the threshold, then the UE may use only one radio bearer to conserve power. In some implementations, the UE may modify the ul-DataSplitThreshold received from the network to enable the UE to concurrently use the 4G and 5G radio bearers to transmit and/or receive positioning messages when an amount of UL data is less than the threshold.

Particular implementations of the subject matter described in this disclosure can be implemented to realize one or more of the following potential advantages. In some implementations, by modifying the ul-DataSplitThreshold, the UE may transmit and/or receive positioning messages concurrently via 4G and 5G radio bearers to improve positioning information associated with the UE.

FIG. 1A shows a diagram of an example wireless network 100. The wireless communications system (also referred to as a wireless wide area network (WWAN)) includes base stations 102, UEs 104, and one or more core networks, illustrated as an Evolved Packet Core (EPC) 160 and a Fifth Generation Core (5GC) 190. While two core networks are shown the wireless communications system may use only one core network, e.g., the 5GC 190. The base stations 102 may include macrocells (high power cellular base station) or small cells (low power cellular base station). The macrocells include base stations. The small cells include femtocells, picocells, and microcells.

The base stations 102 configured for 4G LTE, referred to as eNodeBs (eNBs), (collectively referred to as Evolved Universal Mobile Telecommunications System (UMTS) Terrestrial Radio Access Network (E-UTRAN)) may interface with the EPC 160 through backhaul links 132 (such as the S1 interface). The base stations 102 configured for 5G NR, referred to as gNodeBs (gNBs), (collectively referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (such as handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (such as through the EPC 160 or 5GC 190) with each other over backhaul links 134 (such as the X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A "cell" is a logical communication entity used for communication with a base station (e.g., over some frequency resource, referred to as a carrier frequency, component carrier, carrier, band, or the like), and may be associated with an identifier (e.g., a physical cell identifier (PCID), a virtual cell identifier (VCID)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. In some cases, the term "cell" may also refer to a geographic coverage area of a base station (e.g., a sector), insofar as a carrier frequency can be detected and used for communication within some portion of geographic coverage areas 110.

A network that includes both small cell and macrocells may be known as a heterogeneous network. A heterogeneous network also may include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (such as 5 MHz, 10 MHz, 15 MHz, 20 MHz, 100 MHz, 400 MHz, etc.) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (such as more or fewer carriers may be allocated for DL than for UL).

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels. A secondary carrier is a carrier operating on a second frequency (e.g., FR2) that may be configured once the RRC connection is established between the UE 104 and the anchor carrier and that may be used to provide additional radio resources. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The small cell 102' may operate in a licensed or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to or increase capacity of the access network.

A base station 102, whether a small cell 102' or a large cell (such as a macro base station), may include an eNB, gNodeB (gNB), or another type of base station. Some base stations, such as gNB 180, may operate in a traditional sub 6 GHz spectrum, in millimeter wave (mmW) frequencies, or near mmW frequencies in communication with the UE 104. When the gNB 180 operates in mmW or near mmW frequencies, the gNB 180 may be referred to as a millimeter wave or mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (such as between 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 also may transmit a beamformed signal to the base station 180 in one or more transmit directions. The base station 180 may receive the beamformed signal from the UE 104 in one or more receive directions. The base station 180 and UE 104 may perform beam training to determine the best receive and transmit directions for each of the base station 180 and UE 104. The transmit and receive directions for the base station 180 may or may not be the same. The transmit and receive directions for the UE 104 may or may not be the same.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

The EPC 160, by way of example, may include a Mobility Management Entity (MME) 162, an Enhanced Serving Mobile Location Center (E-SMLC) 164, a Serving Gateway 166, a Gateway Mobile Location Center (GMLC) 168, a Home Secure User Plane Location (SUPL) Location Platform (H-SLP) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. The E-SMLC 164 may support location determination of the UEs, e.g., using the 3GPP control plane (CP) location solution. All user Internet protocol (IP) packets are transferred through the Serving Gateway 166, which itself is connected to the PDN Gateway 172. The PDN Gateway 172 provides UE IP address allocation as well as other functions. The PDN Gateway 172 is connected to the IP Services 176. The IP Services 176 may include the Internet, an intranet, an IP Multimedia Subsystem (IMS), a PS Streaming Service, and/or other IP services. The GMLC 168 may provide location access to the UE on behalf of external clients 169, e.g., that may be within or IP Services 176. The H-SLP 170 may support the SUPL User Plane (UP) location solution defined by the Open Mobile Alliance (OMA) and may support location services for UEs based on subscription information for the UEs stored in H-SLP 170.

The 5GC 190 may include an H-SLP 191, an Access and Mobility Management Function (AMF) 192, a Gateway Mobile Location Center (GMLC) 193, a Session Management Function (SMF) 194, and a User Plane Function (UPF) 195, a Location Management Function (LMF) 196. The AMF 192 may be in communication with a Unified Data Management (UDM) 197. The AMF 192 is the control node that processes the signaling between the UEs 104 and the 5GC 190 and which, for positioning functionality, may communicate with the LMF 196, which may support location determination of UEs. In some implementations, the LMF 196 may be co-located with a base station 102 in the NG-RAN and may be referred to as a Location Management Component (LMC). The GMLC 193 may be used to allow an external client 199, outside or within IP Services 198, to receive location information regarding the UEs. All user Internet protocol (IP) packets may be transferred through the UPF 195. The UPF 195 provides UE IP address allocation as well as other functions. The UPF 195 is connected to the IP Services 198. The H-SLP 191 may likewise be connected to the IP Services 198 The IP Services 198 may include the Internet, an intranet, an IP Multimedia Subsystem (IMS), a PS Streaming Service, and/or other IP services.

The base station 102 also may be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (such as an MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (such as a parking meter, gas pump, toaster, vehicles, heart monitor, etc.). Some of the UEs 104 may be referred to as IIoT devices, such as sensors, instruments, and other devices networked together, in an industrial application, e.g., within a factory. The UE 104 also may be referred to as a station, a mobile station, a subscriber station, a mobile unit, a subscriber unit, a wireless unit, a remote unit, a mobile device, a wireless communication device, a wireless communications device, a remote device, a mobile subscriber station, an access terminal, a mobile terminal, a wireless terminal, a remote terminal, a handset, a user agent, a mobile client, a client, or some other suitable terminology.

Figure 1B:
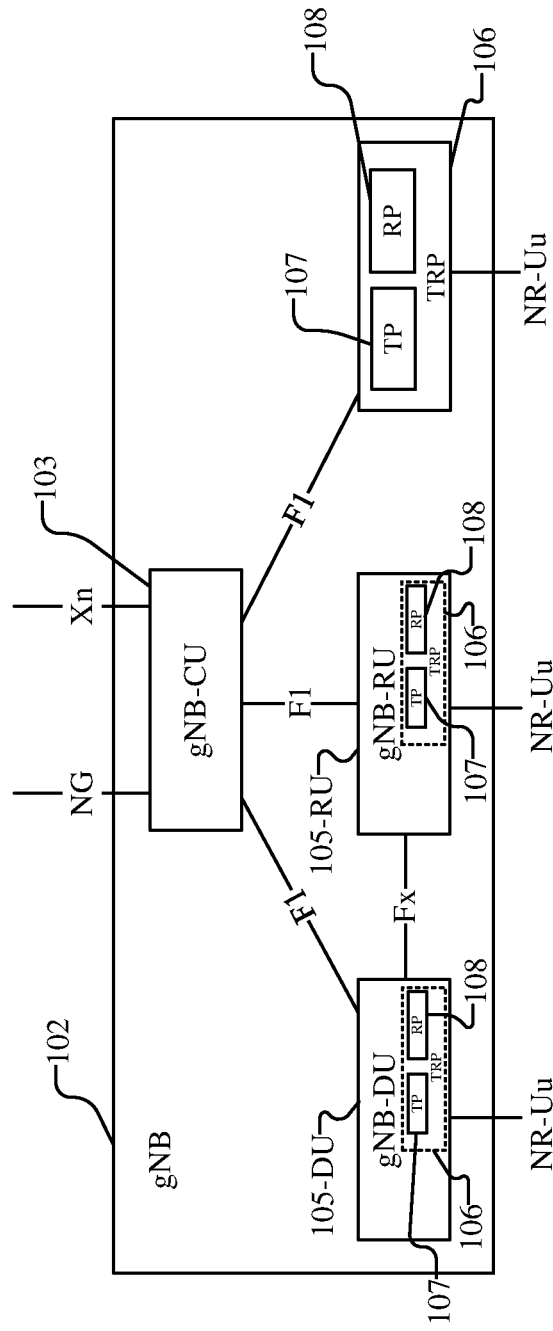
FIG. 1B shows an architecture diagram of a base station node that may be within FIG. 1A.

FIG. 1B shows an architecture diagram of an NG-RAN node, e.g., base station 102, that may be within an NG-RAN in FIG. 1A, e.g., as a separate entity or as part of another gNB. The base station 102 may be a gNB, according to one implementation. The architecture shown in FIG. 1B, for example, may be applicable to any base station in FIG. 1A.

As illustrated, gNB 102 may include a gNB Central Unit (gNB-CU) 103, a gNB Distributed Unit (gNB-DU) 105-DU, a gNB Remote Unit (gNB-RU) 105-RU, which may be physically co-located in the gNB 102 or may be physically separate. The gNB-CU 103 is a logical or physical node hosting support for Radio Resource Control (RRC), Service Data Adaptation Protocol (SDAP) and Packet Data Convergence Protocol (PDCP) protocols of the gNB 102 used over the NR Uu air interface and controlling the operation of one or more gNB-DUs and/or gNB-RUs. The gNB-CU 103 terminates an F1 interface connected with a gNB-DU and in some implementations, an F1 interface connected with a gNB-RU. As illustrated, the gNB-CU 103 may communicate with an AMF via an NG interface. The gNB-CU 103 may further communicate with one or more other gNBs 102 via an Xn interface. The gNB-DU 105-DU is a logical or physical node hosting support for Radio Link Control (RLC), Medium Access Control (MAC) and Physical (PHY) protocol layers used over the NR Uu air interface of the gNB 102, operation of which is partly controlled by gNB-CU 103. The gNB-DU terminates the F1 interface connected with the gNB-CU 103, and may terminate a lower layer split point interface Fx with a gNB-RU. The gNB-RU 105-RU may be based on a lower layer function split and is a logical or physical node hosting support for lower layer functions, such as PHY and Radio Frequency (RF) protocol layers used over the NR Uu air interface of the gNB 102, operation of which is partly controlled by gNB-CU 103 and/or gNB-DU 105-DU. The gNB-RU 105-RU terminates the Fx interface connected with the gNB-DU 105-DU and in some implementations may terminate the F1 interface connected with the gNB-CU 103.

The gNB-CU 103 requests positioning measurements (e.g. E-CID) to the gNB-DU 105-DU and/or gNB-RU 105-RU. The gNB-DU 105-DU and/or gNB-RU 105-RU may report the measurements back to the gNB-CU 103. A gNB-DU 105-DU or gNB-RU 105-RU may include positioning measurement functionality. It should be understood that a separate measurement node is not precluded.

Additionally, as illustrated in FIG. 1B, gNB 102 may include a Transmission Point (TP) 107 and a Reception Point (RP) 108 combined into a Transmission Reception Point (TRP) 106, which may be physically or logically located in the gNB 102. The gNB-CU 103 may be configured to communicate with the TP 107 and RP 108, e.g., via F1 interfaces. The gNB-CU 103, thus, controls one or more TPs 107 and RPs 108 which are accessible from the gNB-CU 103 via an F1 interface.

In some embodiments, the base station 102 (or gNB 102) may comprise a subset of the elements shown in FIG. 1B. For example, the NG-RAN node 102 may comprise the gNB-CU 103 but may not include one or more of gNB-DU 105-DU and gNB-RU 105-RU, RP 108, or TP 107. Alternatively, base station 102 may include one or more of gNB-DU 105-DU and, RP 108 or TP 107 but may not include gNB-RU 105-RU.

Further, the elements shown in FIG. 1B may be logically separate but physically co-located or may be partially or completely physically separate. For example, one or more of gNB-DU 105-DU and/or gNB-RU 105-RU, RP 108 or TP 107 may be physically separate from gNB-CU 103 or may be physically combined with gNB-CU 103. In the case of physical separation, the F1 or Fx interface may define signaling over a physical link or connection between two separated elements. In some implementations, gNB-CU 103 may be split into a control plane portion (referred to as a CU-CP or gNB-CU-CP) and a user plane portion (referred to as CU-UP or gNB-CU-UP). In this case, both the gNB-CU-CP and gNB-CU-UP may interact with gNB-DU 105-DU and/or gNB-RU 105-RU to support NR Uu air interface signaling for control plane and user plane, respectively.

However, only the gNB-CU-CP may interact with TPs 107 and RPs 108 to support and control location related communication.

Protocol layering between the gNB-CU 103 and the TP 107, and RP 108 may be based on F1 C as defined in 3GPP TS 38.470, which uses an F1 Application Protocol (F1AP) at the top level as specified in 3GPP TS 38.473. New messages to support positioning could be added directly into F1AP or could be introduced in a new location specific protocol which is transported using F1AP.

The location procedures with the gNB-CU 103 may comprise all location related procedures on NG, Xn, and NR-Uu interfaces. For example, the location procedures between an AMF and the base station 102 may use NGAP. The location procedures between base station 102 and other NG-RAN nodes, e.g., gNBs 102, may use XnAP or a protocol above XnAP, such as an extended NR Positioning Protocol A (NRPPa) as defined in 3GPP TS 38.455. The location procedures between base station 102 and UE 104 may use RRC and/or LPP.

The corresponding messages to support positioning may be carried inside a transparent F1AP message transfer container. For example, the Transfer of an NGAP Location Reporting Control and NAS Transport message may be carried in an UL/DL NGAP Message Transfer. The Transfer of location related XnAP messages may be carried in an UL/DL XnAP Message Transfer. The Transfer of location related RRC (LPP) messages may be carried in an UL/DL RRC (LPP) Message Transfer.

Figure 2A:
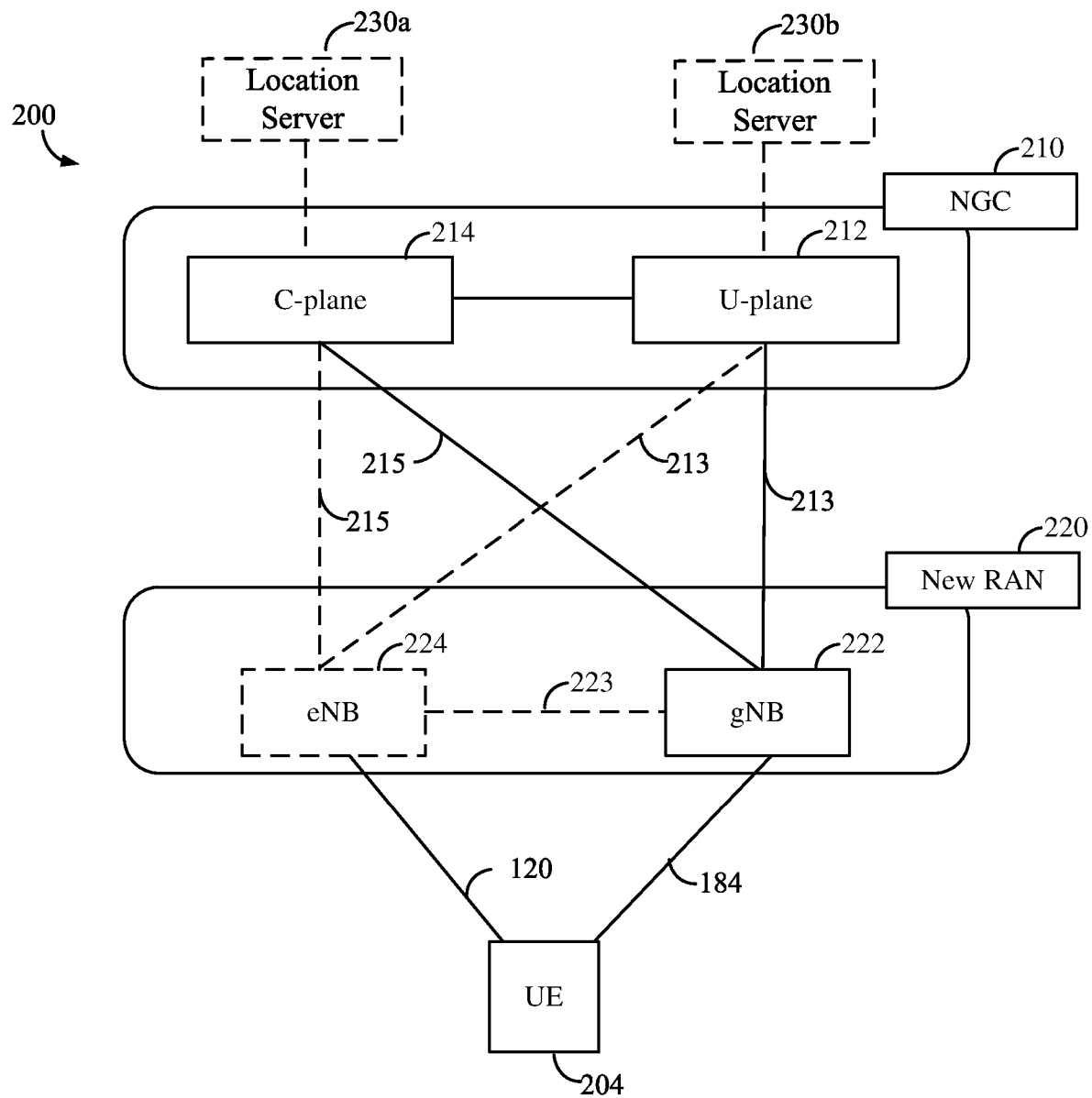
FIGS. 2A and 2B illustrate example wireless network structures, according to various aspects of the disclosure.

FIG. 2A illustrates an example wireless network structure 200. For example, a next generation core (NGC) 210 (also referred to as a "5GC") can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1A). Another optional aspect may include one or more location servers 230a, 230b (sometimes collectively referred to as location server 230) (which may correspond to LMF 196), which may be in communication with the control plane functions 214 and user plane functions 212, respectively, in the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network, e.g., in the New RAN 220.

Figure 2B:
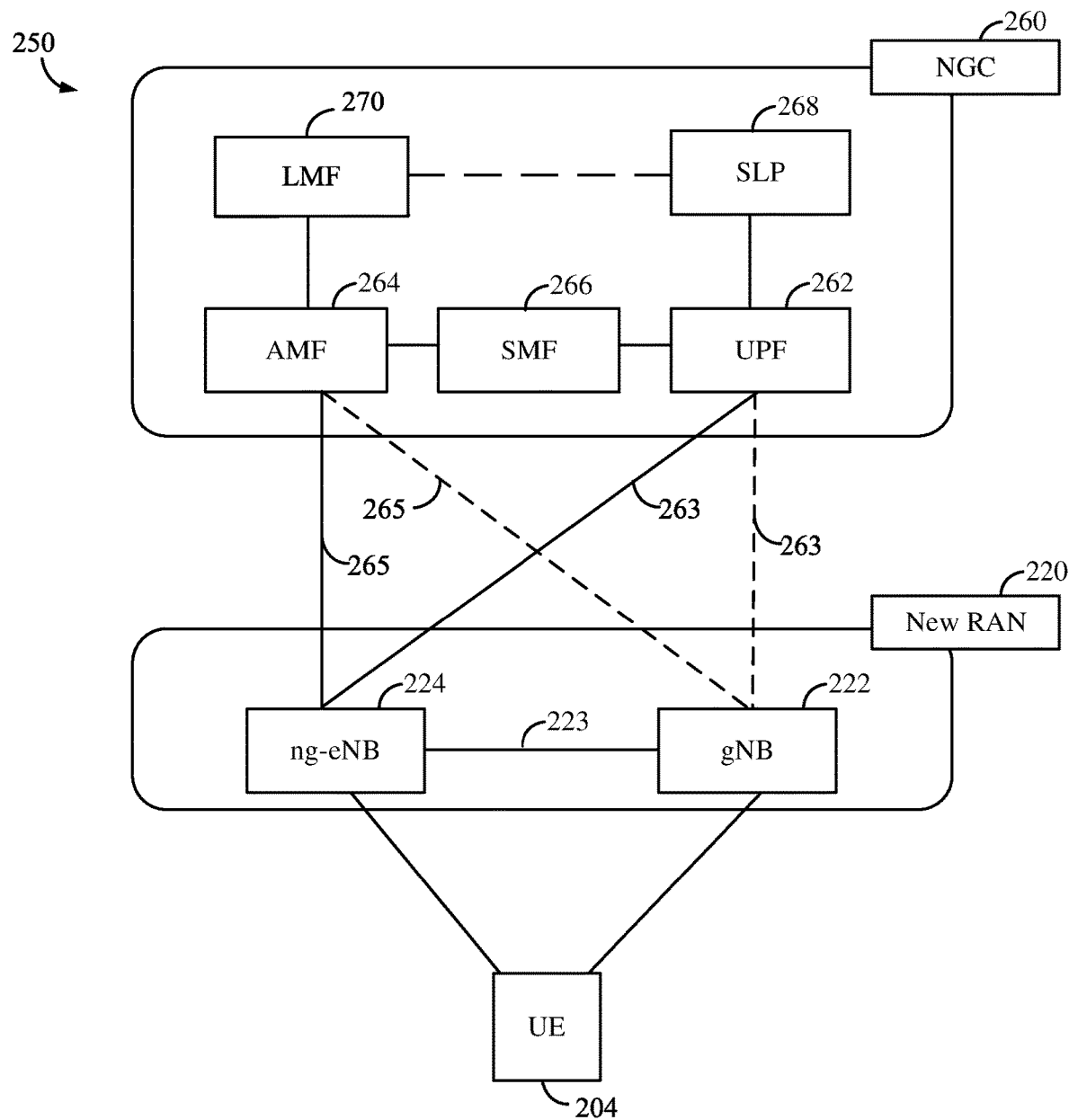

FIG. 2B illustrates another example wireless network structure 250. For example, an NGC 260 (also referred to as a "5GC") can be viewed functionally as control plane functions, provided by an access and mobility management function (AMF) 264, user plane function (UPF) 262, a session management function (SMF) 266, SUPL Location Platform (SLP) 268, and an LMF 270, which operate cooperatively to form the core network (i.e., NGC 260). User plane interface 263 and control plane interface 265 connect the ng-eNB 224 to the NGC 260 and specifically to UPF 262 and AMF 264, respectively. In an additional configuration, a gNB 222 may also be connected to the NGC 260 via control plane interface 265 to AMF 264 and user plane interface 263 to UPF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1A). The base stations of the New RAN 220 communicate with the AMF 264 over the N2 interface and the UPF 262 over the N3 interface.

The functions of the AMF 264 include registration management, connection management, reachability management, mobility management, lawful interception, transport for session management (SM) messages between the UE 204 and the SMF 266, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and the location management function (LMF) 270 (which may correspond to LMF 196), as well as between the New RAN 220 and the LMF 270, evolved packet system (EPS) bearer identifier allocation for interworking with the EPS, and UE 204 mobility event notification. In addition, the AMF 264 also supports functionalities for non-Third Generation Partnership Project (3GPP) access networks.

Functions of the UPF 262 include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3:
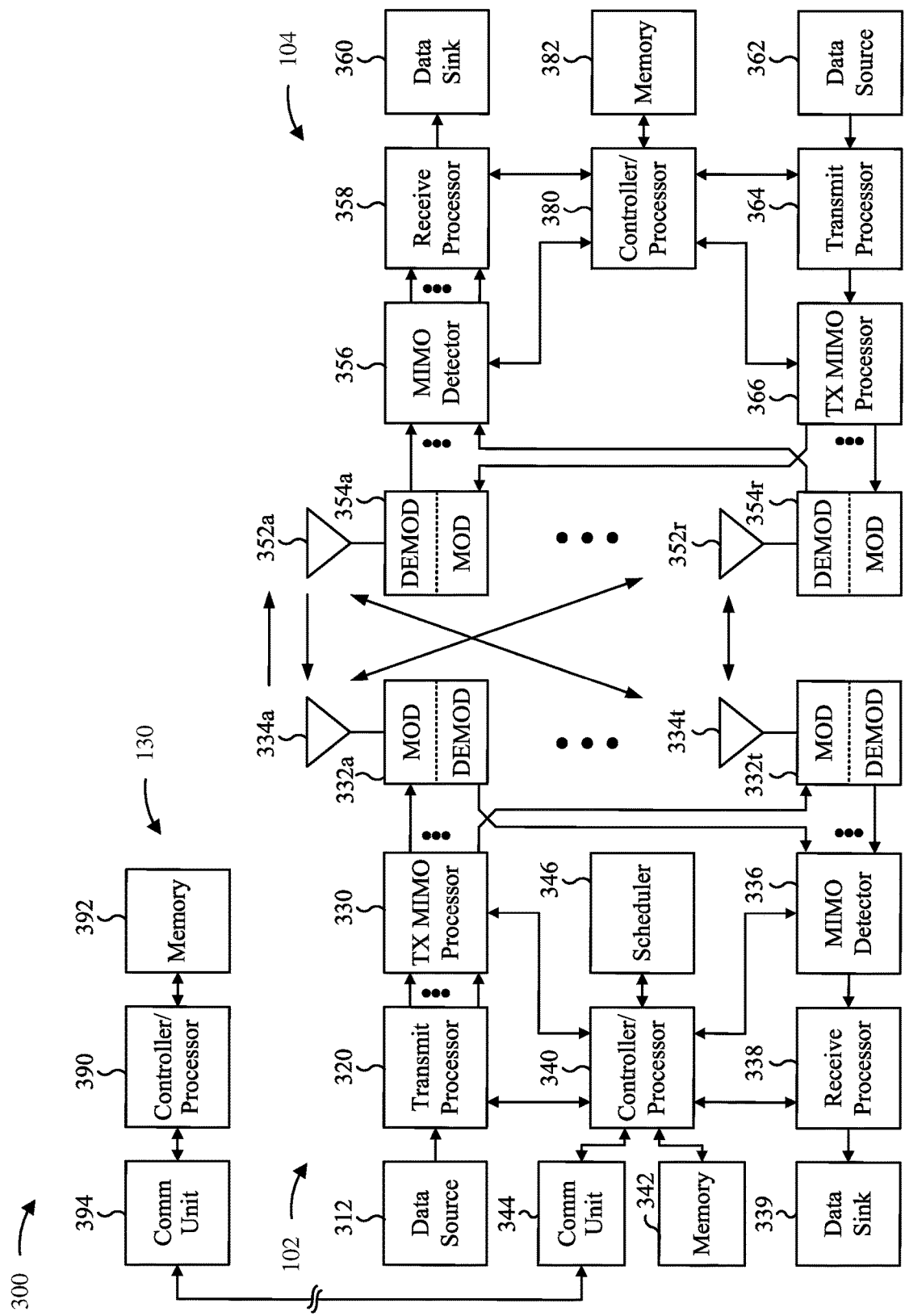
FIG. 3 shows a block diagram of a design of base station and user equipment (UE), which may be one of the base stations and one of the UEs in FIG. 1.

FIG. 3 shows a block diagram of a design 300 of base station 102 and UE 104, which may be one of the base stations and one of the UEs in FIG. 1A. Base station 102 may be equipped with T antennas 334a through 334t, and UE 104 may be equipped with R antennas 352a through 352r, where in general T>1 and R>1.

At base station 102, a transmit processor 320 may receive data from a data source 312 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 320 may also process system information (e.g., for semi-static resource partitioning information (SRPI) and/or the like) and control information (e.g., CQI requests, grants, upper layer signaling, and/or the like) and provide overhead symbols and control symbols. Transmit processor 320 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 330 may perform spatial processing (e.g., precoding) on the data symbols, the control symbols, the overhead symbols, and/or the reference symbols, if applicable, and may provide T output symbol streams to T modulators (MODs) 332a through 332t. Each modulator 332 may process a respective output symbol stream (e.g., for OFDM and/or the like) to obtain an output sample stream. Each modulator 332 may further process (e.g., convert to analog, amplify, filter, and upconvert) the output sample stream to obtain a downlink signal. T downlink signals from modulators 332a through 332t may be transmitted via T antennas 334a through 334t, respectively. According to various aspects described in more detail below, the synchronization signals can be generated with location encoding to convey additional information.

At UE 104, antennas 352a through 352r may receive the downlink signals from base station 102 and/or other base stations and may provide received signals to demodulators (DEMODs) 354a through 354r, respectively. Each demodulator 354 may condition (e.g., filter, amplify, down convert, and digitize) a received signal to obtain input samples. Each demodulator 354 may further process the input samples (e.g., for OFDM and/or the like) to obtain received symbols. A MIMO detector 356 may obtain received symbols from all R demodulators 354a through 354r, perform MIMO detection on the received symbols if applicable, and provide detected symbols. A receive processor 358 may process (e.g., demodulate and decode) the detected symbols, provide decoded data for UE 104 to a data sink 360, and provide decoded control information and system information to a controller/processor 380. A channel processor may determine reference signal received power (RSRP), received signal strength indicator (RSSI), reference signal received quality (RSRQ), channel quality indicator (CQI), and/or the like. In some aspects, one or more components of UE 104 may be included in a housing.

On the uplink, at UE 104, a transmit processor 364 may receive and process data from a data source 362 and control information (e.g., for reports comprising RSRP, RSSI, RSRQ, CQI, and/or the like) from controller/processor 380. Transmit processor 364 may also generate reference symbols for one or more reference signals. The symbols from transmit processor 364 may be precoded by a TX MIMO processor 366 if applicable, further processed by modulators 354a through 354r (e.g., for DFT-s-OFDM, CP-OFDM, and/or the like), and transmitted to base station 102. At base station 102, the uplink signals from UE 104 and other UEs may be received by antennas 334, processed by demodulators 332, detected by a MIMO detector 336 if applicable, and further processed by a receive processor 338 to obtain decoded data and control information sent by UE 104. Receive processor 338 may provide the decoded data to a data sink 339 and the decoded control information to controller/processor 340. Base station 102 may include communication unit 344 and communicate to network controller 130 via communication unit 344. Network controller 130 may include communication unit 394, controller/processor 390, and memory 392.

Controller/processor 340 of base station 102, controller/processor 380 of UE 104, controller/processor 390 of the network controller 130 and/or any other component(s) of FIG. 3 may perform one or more techniques for supporting positioning of the UE 102 in split bearer mode, as described in more detail elsewhere herein. For example, controller/processor 340 of base station 102, controller/processor 380 of UE 104, controller/processor 390 of the network controller 130 and/or any other component(s) of FIG. 3 may perform or direct operations of, for example, operation 800 of FIG. 8, and/or other processes as described herein. Memories 342, 382, and 392 may store data and program codes for base station 102, UE 104, and network controller 130, respectively. In some aspects, memory 342 and/or memory 382 and/or 392 may comprise a non-transitory computer-readable medium storing one or more instructions for wireless communication. For example, the one or more instructions, when executed by one or more processors of the base station 102 and/or the UE 104 and/or the network controller, may perform or direct operations of, for example, operation 800 of FIG. 8, and/or other processes as described herein. A scheduler 346 may schedule UEs for data transmission on the downlink and/or uplink.

As indicated above, FIG. 3 is provided as an example. Other examples may differ from what is described with regard to FIG. 3.

Figure 4:
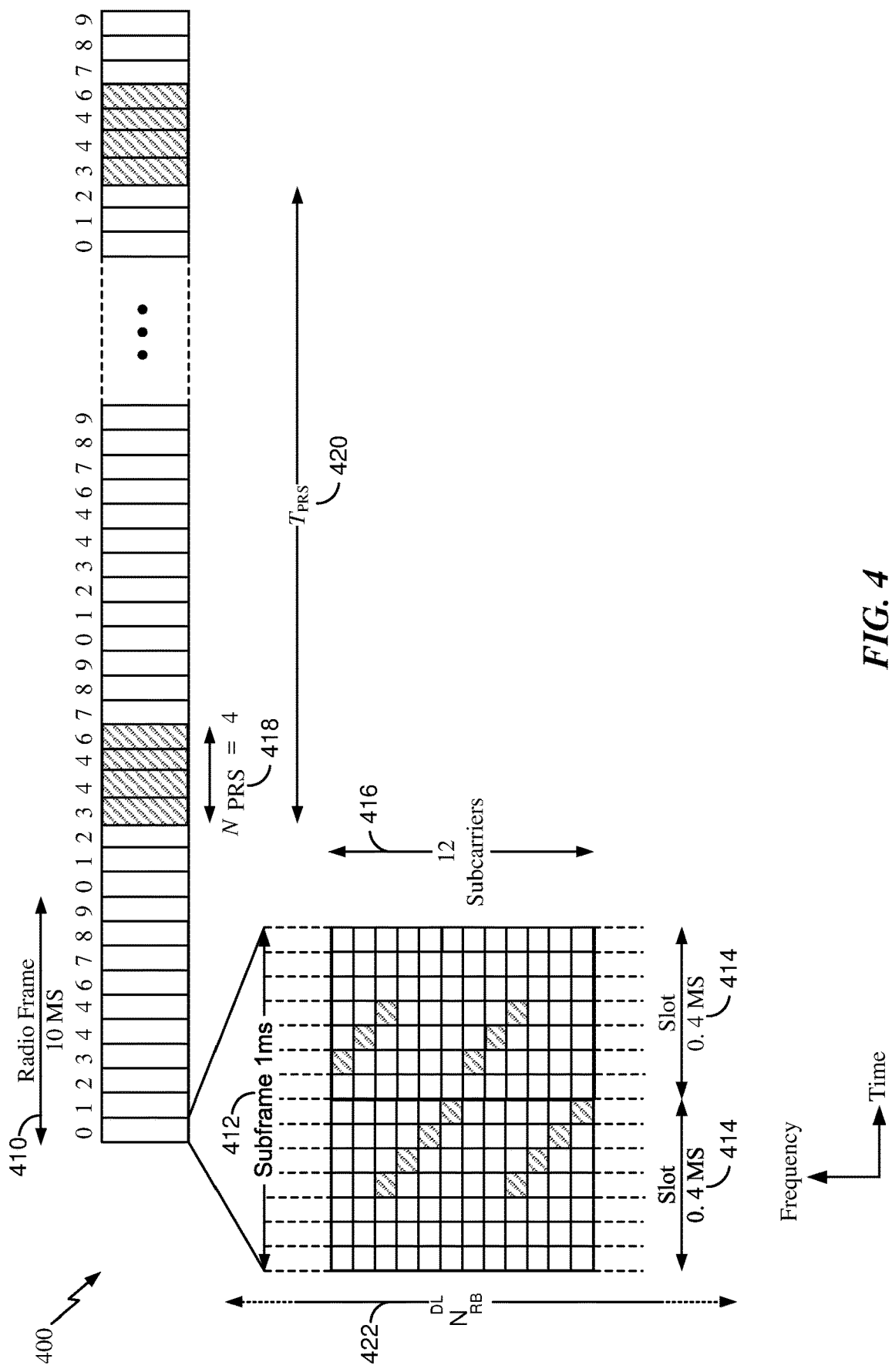
FIG. 4 shows diagram of a structure of an example subframe sequence with positioning reference signal (PRS) positioning occasions, according to aspects of the disclosure.

FIG. 4 shows diagram of a structure of an example subframe sequence 400 with positioning reference signal (PRS) positioning occasions, according to aspects of the disclosure. Subframe sequence 400 may be applicable to the broadcast of PRS signals from a base station (e.g., any of the base stations described herein) or another network node. The subframe sequence 400 may be used in LTE systems, and the same or similar subframe sequence may be used in other communication technologies/protocols, such as 5G and NR. In FIG. 4, time is represented horizontally (e.g., on the X axis) with time increasing from left to right, while frequency is represented vertically (e.g., on the Y axis) with frequency increasing (or decreasing) from bottom to top. As shown in FIG. 4, downlink and uplink radio frames 410 may be of 10 millisecond (ms) duration each. For downlink frequency division duplex (FDD) mode, radio frames 410 are organized, in the illustrated example, into ten subframes 412 of 1 ms duration each. Each subframe 412 comprises two slots 414, each of, for example, 0.5 ms duration.

In the frequency domain, the available bandwidth may be divided into uniformly spaced orthogonal subcarriers 416 (also referred to as "tones" or "bins"). For example, for a normal length cyclic prefix (CP) using, for example, 15 kHz spacing, subcarriers 416 may be grouped into a group of twelve (12) subcarriers. A resource of one OFDM symbol length in the time domain and one subcarrier in the frequency domain (represented as a block of subframe 412) is referred to as a resource element (RE). Each grouping of the 12 subcarriers 416 and the 14 OFDM symbols is termed a resource block (RB) and, in the example above, the number of subcarriers in the resource block may be written as $N_{SC}^{RB}=12$. For a given channel bandwidth, the number of available resource blocks on each channel 422, which is also called the transmission bandwidth configuration 422, is indicated as $N_{RB}^{DL}$. For example, for a 3 MHz channel bandwidth in the above example, the number of available resource blocks on each channel 422 is given by $N_{RB}^{DL}=15$. Note that the frequency component of a resource block (e.g., the 12 subcarriers) is referred to as a physical resource block (PRB).

A base station may transmit radio frames (e.g., radio frames 410), or other physical layer signaling sequences, supporting PRS signals (i.e. a downlink (DL) PRS) according to frame configurations either similar to, or the same as that, shown in FIG. 4, which may be measured and used for a UE (e.g., any of the UEs described herein) position estimation. Other types of wireless nodes (e.g., a distributed antenna system (DAS), remote radio head (RRH), UE, AP, etc.) in a wireless communications network may also be configured to transmit PRS signals configured in a manner similar to (or the same as) that depicted in FIG. 4.

A collection of resource elements that are used for transmission of PRS signals is referred to as a "PRS resource." The collection of resource elements can span multiple PRBs in the frequency domain and N (e.g., 1 or more) consecutive symbol(s) within a slot 414 in the time domain. For example, the cross-hatched resource elements in the slots 414 may be examples of two PRS resources. A "PRS resource set" is a set of PRS resources used for the transmission of PRS signals, where each PRS resource has a PRS resource identifier (ID). In addition, the PRS resources in a PRS resource set are associated with the same transmission-reception point (TRP). A PRS resource ID in a PRS resource set is associated with a single beam transmitted from a single TRP (where a TRP may transmit one or more beams). Note that this does not have any implications on whether the TRPs and beams from which signals are transmitted are known to the UE.

PRS may be transmitted in special positioning subframes that are grouped into positioning occasions. A PRS occasion is one instance of a periodically repeated time window (e.g., consecutive slot(s)) where PRS are expected to be transmitted. Each periodically repeated time window can include a group of one or more consecutive PRS occasions. Each PRS occasion can comprise a number $N_{PRS}$ of consecutive positioning subframes. The PRS positioning occasions for a cell supported by a base station may occur periodically at intervals, denoted by a number $T_{PRS}$ of milliseconds or subframes. As an example, FIG. 4 illustrates a periodicity of positioning occasions where $N_{PRS}$ equals 4 418 and $T_{PRS}$ is greater than or equal to 20 420. In some aspects, $T_{PRS}$ may be measured in terms of the number of subframes between the start of consecutive positioning occasions. Multiple PRS occasions may be associated with the same PRS resource configuration, in which case, each such occasion is referred to as an "occasion of the PRS resource" or the like.

A PRS may be transmitted with a constant power. A PRS can also be transmitted with zero power (i.e., muted). Muting, which turns off a regularly scheduled PRS transmission, may be useful when PRS signals between different cells overlap by occurring at the same or almost the same time. In this case, the PRS signals from some cells may be muted while PRS signals from other cells are transmitted (e.g., at a constant power). Muting may aid signal acquisition and time of arrival (TOA) and reference signal time difference (RSTD) measurement, by UEs, of PRS signals that are not muted (by avoiding interference from PRS signals that have been muted). Muting may be viewed as the non-transmission of a PRS for a given positioning occasion for a particular cell. Muting patterns (also referred to as muting sequences) may be signaled (e.g., using the LTE positioning protocol (LPP)) to a UE using bit strings. For example, in a bit string signaled to indicate a muting pattern, if a bit at position j is set to '0', then the UE may infer that the PRS is muted for a $j^{th}$ positioning occasion.

A PRS configuration, as described above, including the PRS transmission/muting schedule, is signaled to the UE to enable the UE to perform PRS positioning measurements. The UE is not expected to blindly perform detection of PRS configurations. In some implementations, the PRS may be transmitted in support of a positioning session in which the location of the UE is determined. Thus, one or more positioning occasions may be included within a positioning session.

Note that the terms "positioning reference signal" and "PRS" may sometimes refer to specific reference signals that are used for positioning in LTE systems. However, as used herein, unless otherwise indicated, the terms "positioning reference signal" and "PRS" refer to any type of reference signal that can be used for positioning, such as but not limited to, PRS signals in LTE, navigation reference signals (NRS), transmitter reference signals (TRS), cell-specific reference signals (CRS), channel state information reference signals (CSI-RS), primary synchronization signals (PSS), secondary synchronization signals (SSS), etc.

Similar to DL PRS transmitted by base stations, discussed above, a UE 104 may transmit UL PRS for positioning. The UL PRS may be sometimes referred to as sounding reference signals (SRS) for positioning. Using received DL PRS from base stations and/or UL PRS transmitted to base stations, the UE may perform various positioning methods, such as time of arrival (TOA), reference signal time difference (RSTD), time difference of arrival (TDOA), reference signal received power (RSRP), time difference between reception and transmission of signals (Rx-Tx), Angle of Arrival (AoA) or Angle of Departure (AoD), etc. In some implementations, the DL PRS and UL PRS are received and transmitted jointly to perform Round Trip Time (RTT) positioning measurements with one or multiple base stations (multi-RTT).

Figure 5:
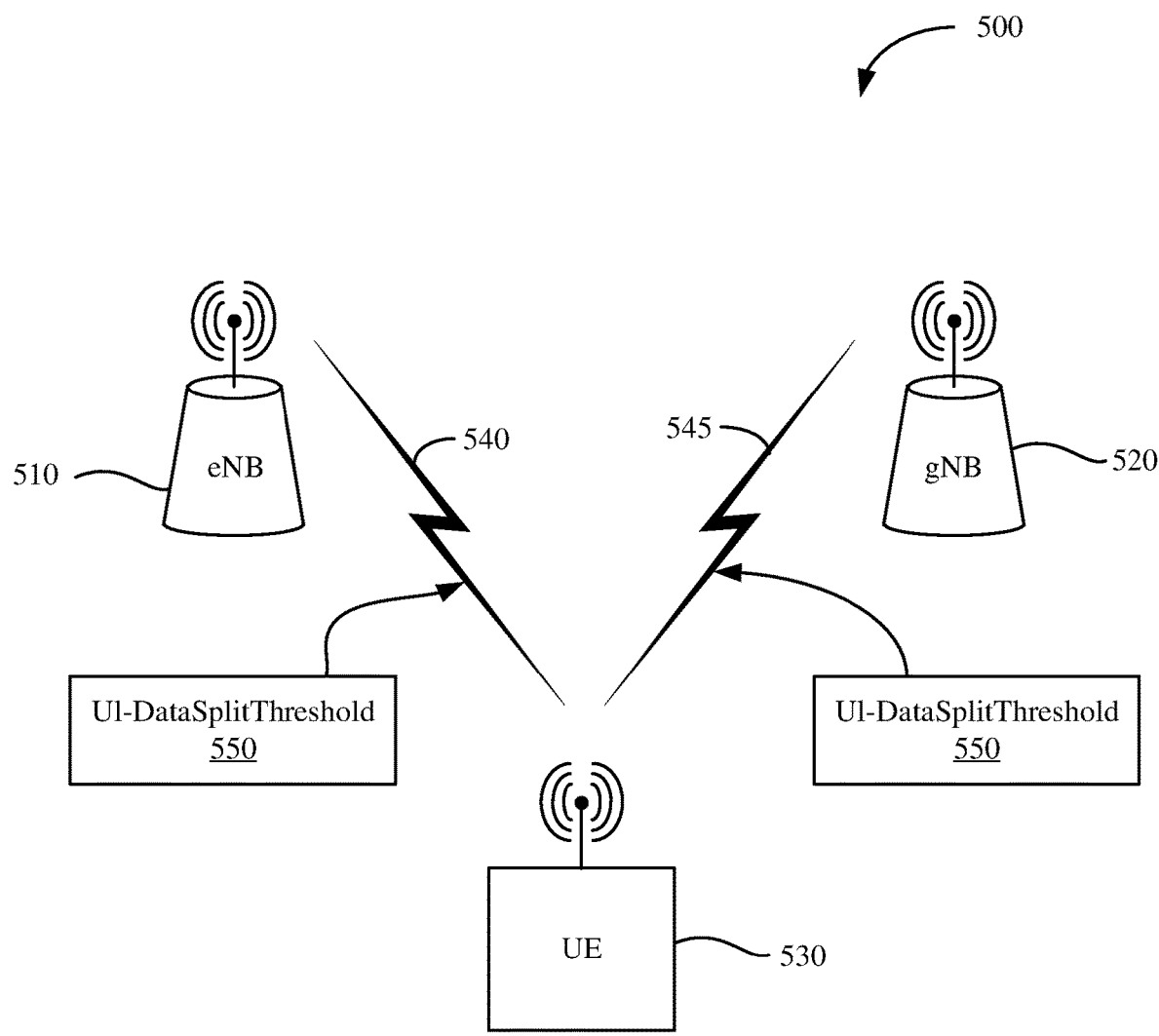
FIG. 5 shows an example wireless network structure which may include a first base station, a second base station, and a UE.

FIG. 5 shows an example wireless network structure 500 which may include a first base station 510, a second base station 520, and a UE 530. The first and second base stations 510 and 520 may be an example of the base stations 102 of FIG. 1A and the UE 530 may be an example of the UEs 104 of FIGS. 1A and 3 and/or the UE 204 of FIGS. 2A and 2B. The first base station 510, for example, may be configured for 4G LTE operation and is referred to as an eNB. The second base station 520, for example, may be configured for 5G (NR) operation and is referred to as a gNB. Although only one UE and two base stations are shown here for simplicity, in other implementations, the wireless network structure 500 may include any feasible number of base stations and UEs.

The UE 530 may be capable of operating as an Evolved-Universal Terrestrial Radio Access New Radio Dual Connectivity (ENDC) device. When operating as an ENDC device, the UE 530 may communicate with the first base station 510 and/or the second base station 520. Thus, in some implementations the first base station 510 may provide a first radio bearer 540 and the second base station 520 may provide a second radio bearer 545. The UE 530 may transmit UL data and/or receive DL data to/from the first base station 510 (e.g., the eNB) via the first radio bearer 540 and the second base station 520 (e.g., the gNB) via the second radio bearer 545. Thus, the first radio bearer 540 may be an LTE radio bearer and the second radio bearer 545 may be a 5G or NR radio bearer.

Further still, the UE 530 may be configured to operate in a "split bearer" mode. In the split bearer mode, the UE 530 may transmit UL data through the first radio bearer 540 and through the second radio bearer 545 simultaneously. In some implementations, one of the radio bearers may be designated as a primary bearer and one or more other radio bearers may be designated as a secondary bearer. Operation in the split bearer mode may be controlled, at least in part, by a threshold referred to as a ul-DataSplitThreshold 550 provided to the UE 530 by the first base station 510 and/or the second base station 520. In the split bearer mode, the UE 530 may transmit UL data though the primary bearer until the amount of UL data exceeds the ul-DataSplitThreshold 550. If the amount of UL data exceeds the ul-DataSplitThreshold 550, then the UE 530 also may transmit UL data through the secondary bearer. In this manner, the UE may save energy by using a primary bearer and releasing the secondary bearer until the amount of UL data exceeds a threshold. The ul-DataSplitThreshold 550 may be provided by the network controller 130 of FIG. 3 (not shown for simplicity). In this manner, the network controller 130 may control the use of the first and second radio bearers 540 and 545 by the UE 530.

In some implementations, the UE 530 may modify the ul-DataSplitThreshold 550 in order to improve the performance and/or accuracy of a positioning session. The modification and restoration of the ul-DataSplitThreshold 550 is described below in more detail with respect to FIGS. 6-8.

Figure 6:
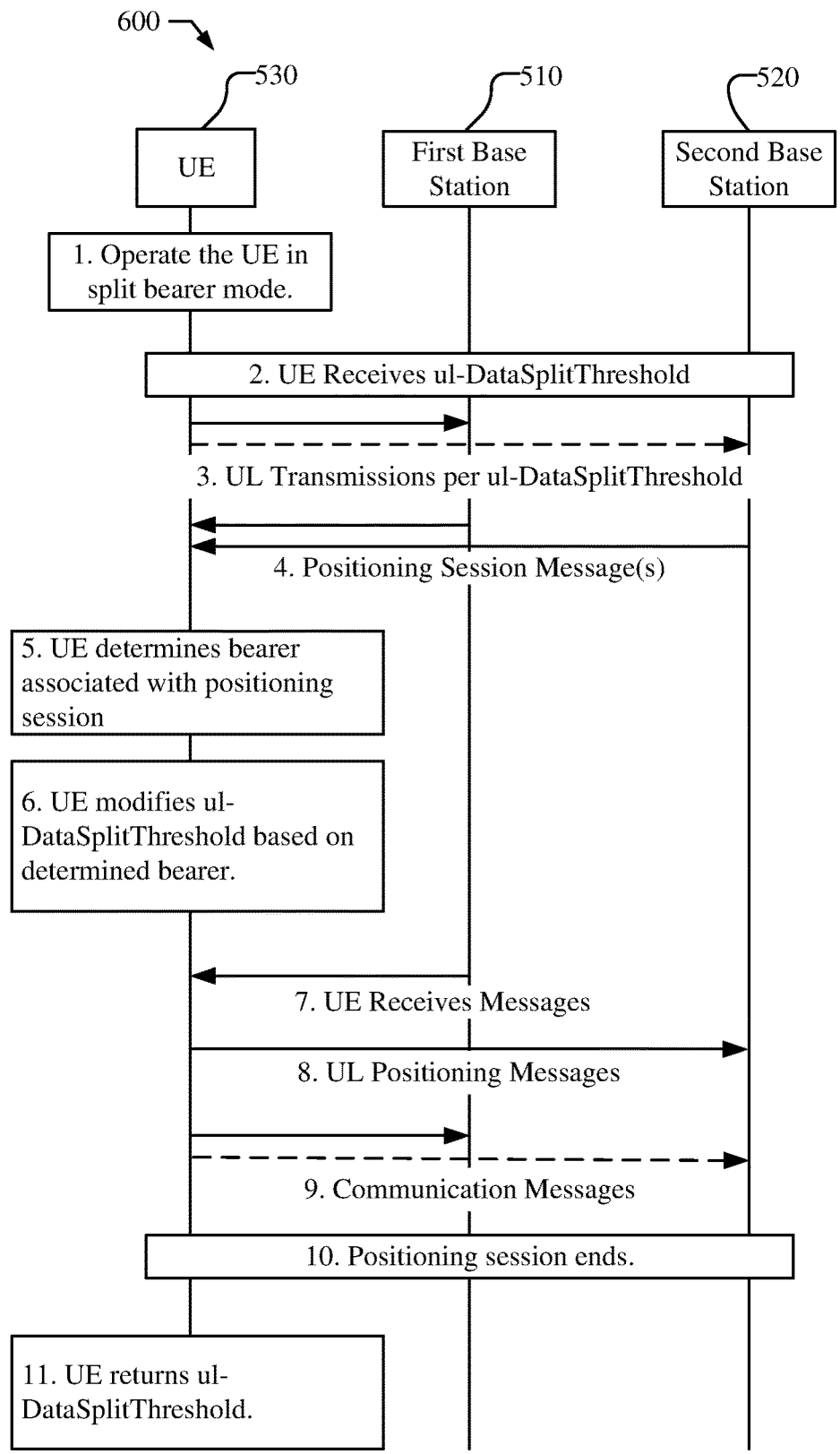
FIG. 6 is a message flow diagram with various messages sent between entities in a wireless system, which may include a UE, a first base station, and a second base station.

FIG. 6 is a message flow diagram 600 with various messages sent between entities in a wireless system, which may include the UE 530, the first base station 510, and the second base station 520 of FIG. 5. As described above, the first base station 510 may be an eNB and the second base station 520 may be a gNB. In other implementations, the first base station 510 may be a gNB and the second base station 520 may be an eNB. In some implementations, a positioning session may include the transmission and/or reception of positioning messages (for example, PRS messages) through the primary and secondary bearers of a wireless system. However, the positioning messages that are associated with the secondary bearer may not be transmitted and/or received, particularly if the UL data does not exceed the ul-DataSplitThreshold 550. Modifying the ul-DataSplitThreshold 550 may enable positioning messages to be transmitted through the secondary bearer even when there is insufficient UL data.

At stage 1, the UE 530 is operated in a split bearer mode. In the split bearer mode, the UE 530 may be configured to communicate simultaneously through the first radio bearer 540 with the first base station 510 and through the second radio bearer with the second base station 520. In particular, the UE 530 may be configured to simultaneously transmit UL data through the first radio bearer 540 and the second radio bearer 545 to the respective base stations. Further, one of the radio bearers may be specified as a primary bearer while other radio bearers may be specified as a secondary bearer.

At stage 2, the UE 530 receives a threshold, such as the ul-DataSplitThreshold 550 of FIG. 5. The ul-DataSplitThreshold 550 may be a first value and is received from the first base station 510 and/or the second base station 520. In some implementations, the ul-DataSplitThreshold 550 may specify a UL data threshold that, when exceeded, causes the UE 530 to transmit UL data through both the primary and secondary radio bearers. Otherwise, when operating in the split bearer mode, the UE 530 may transmit UL data through the primary bearer. For example, if the ul-DataSplitThreshold 550 is 128 KBs and the amount UL transmit data does not exceed 128 KBs, then the UE 530 may use the primary radio bearer. On the other hand, if the amount of UL transmit data is more than 128 KBs, then the UE 530 may transmit UL data on both the primary and secondary radio bearers.

At stage 3, the UE 530 transmits UL data in accordance with the ul-DataSplitThreshold 550. For example, the UE 530 may transmit UL data to the first base station 510 if the amount of UL data does not exceed the ul-DataSplitThreshold 550. On the other hand, the UE 530 may transmit UL data to the second base station 20 if the amount of UL data exceeds the ul-DataSplitThreshold. In some implementations, the UE 530 may transmit more UL data to the first base station 510 (illustrated with a solid arrow) than to the second base station 520 (illustrated with a dashed arrow).

At stage 4, the UE 530 receives one or more positioning session messages to determine the position of the UE 530. The positioning session message may be received from, e.g., a location server, in the core network associated with the first base station 510, such E-SMLC 164 or H-SLP 170 shown in FIG. 1A or from the core network associated with the second base station 520, such as LMF 196 shown in FIG. 1A and may direct the UE 530 to perform one or more measurements to determine the UE 530 position such as, but not limited to, TOA, RSTD, TDOA, RSRP, AoA, AoD, RTT measurements and/or operations.

At stage 5, the UE 530 determines the radio bearer associated with the positioning session. In some implementations, the radio bearer associated with the positioning session may be specified when the UE 530 is configured to operate in the split bearer mode in stage 1. In other implementations, the bearer associated with the positioning session may be specified within the positioning session message received at stage 4. In some cases, the positioning session may use positioning messages that are associated with a radio bearer not currently used by the UE 530. For example, the positioning session may include positioning messages that are associated with the secondary bearer of the UE 530. If the secondary bearer is not being used by the UE 530 (e.g., the UE 530 does not have sufficient UL data to exceed the ul-DataSplitThreshold 550), then positioning messages using the secondary bearer may be delayed, and/or unsent.

At stage 6, the UE 530 modifies the ul-DataSplitThreshold 550 based on the radio bearer associated with the positioning messages used during the positioning session. For example, if the radio bearer associated with the positioning message is not the primary bearer, then the UE 530 can modify the ul-DataSplitThreshold 550 to a second value that causes at least some UL data to be transmitted through the secondary bearer. In this manner, the second value of the ul-DataSplitThreshold 550 may bias UL data transmission to the radio bearer associated with the positioning session. Since the secondary bearer is used to transmit UL data, any positioning messages associated with the secondary bearer may be more easily received and/or transmitted. Without modifying the ul-DataSplitThreshold 550, UL positioning messages associated with the secondary bearer may be delayed and only transmitted after the UE 530 has UL data that exceeds the first value of the ul-DataSplitThreshold 550. In some implementations, the second value of the ul-DataSplitThreshold 550 may enable the UE 530 to use the primary and secondary bearers independent of the amount of associated transmit UL data. For example, the second value of the ul-DataSplitThreshold 550 may be set to a value such that that any amount of transmit UL data may cause the UE 530 to use both the primary and secondary bearers. In still other implementations, the second value of the threshold may ensure that the secondary bearer is not released during the positioning session. Further, the UE 530 also may send a buffer status report (BSR) to the first base station 510 and/or the second base station 520 in addition to modifying the ul-DataSplitThreshold 550. The BSR may indicate that there is UL data ready for transmission to the associated base station.

At stage 7, the UE 530 receives messages from the first base station 510. In some implementations, the UE 530 may receive non-positioning messages from the first base station 510 that may be used to determine the position of the UE 530.

At stage 8, the UE 530 transmits UL positioning messages to the second base station 520. For example, the UE 530 may transmit positioning messages to the second base station 520. The positioning messages may include the PRS messages and/or the PRS occasions described above with respect to FIG. 4. In some implementations, the second base station 520 may optionally transmit one or more messages to the UE 530 that may be used to determine the location of the UE 530.

At stage 9, the UE 530 may transmit UL data to the first base station 510 and the second base station 520 in accordance with the modified ul-DataSplitThreshold 550. For example, if the primary bearer is associated with the first base station 510, then the UE 530 may transmit UL data to the first base station 510 until the modified ul-DataSplitThreshold 550 is reached (illustrated by the solid arrow). After UL data exceeds the ul-DataSplitThreshold 550, then the UE 530 may transmit UL data to the second base station 520 (illustrated by the dashed arrow).

At stage 10, the positioning session ends. For example, the transmission and reception of positioning messages may end, at least temporarily. Information from the positioning messages may be used to determine the location of the UE, e.g., in the location server for UE assisted positioning or in the UE 530 for UE based positioning. At stage 11, the UE 530 may return to ul-DataSplitThreshold to the first value. In some implementations, since the positioning session is complete, the UE 530 may return to operations to prior to when the ul-DataSplitThreshold was modified in stage 6.

Figure 7:
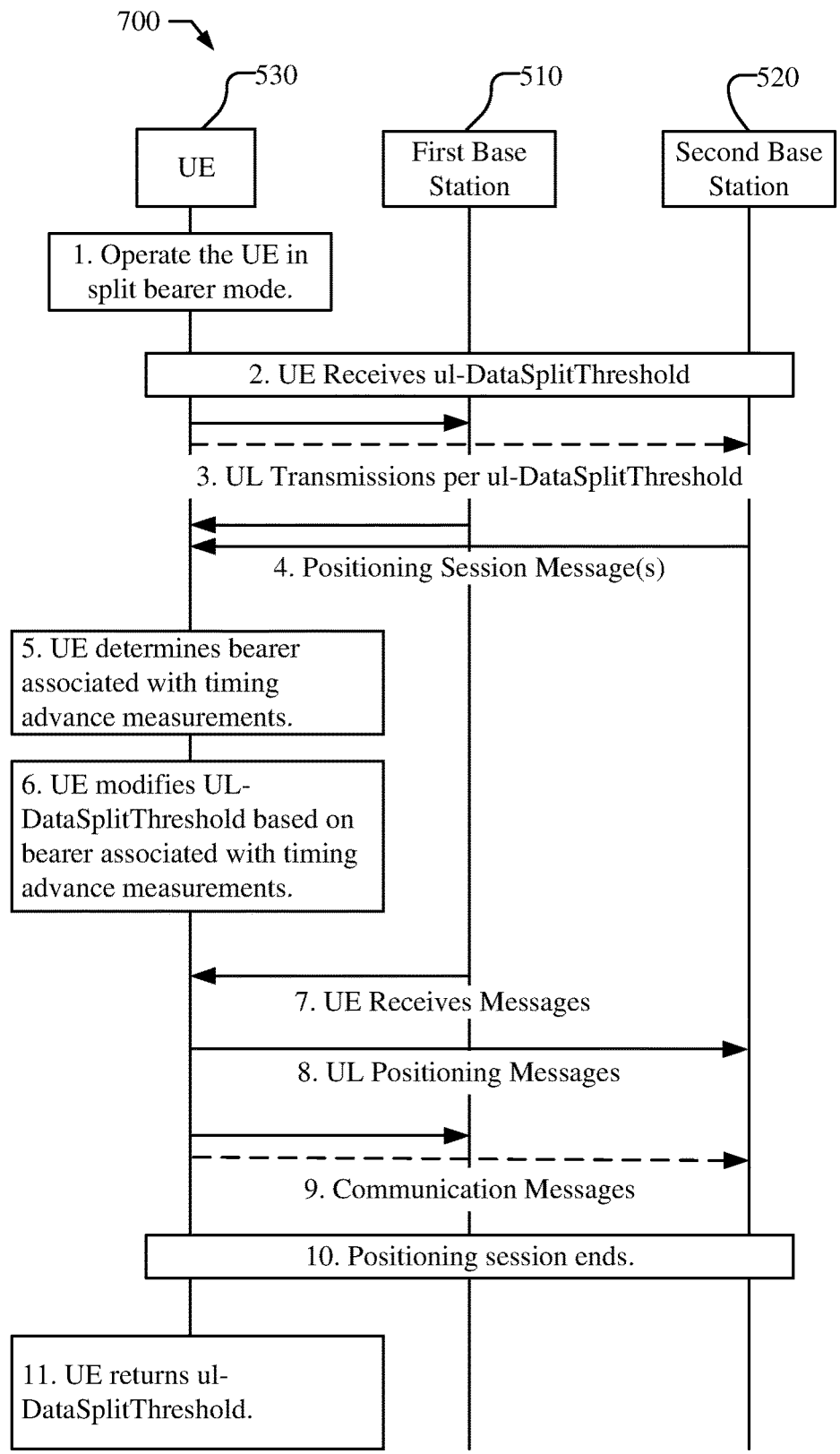
FIG. 7 is another example message flow diagram with various messages sent between entities in a wireless system, which may include the UE 530, the first base station 510, and the second base station 520.

FIG. 7 is another example message flow diagram 700 with various messages sent between entities in a wireless system, which may include the UE 530, the first base station 510, and the second base station 520. Timing advance measurements may be used to time align UL and DL data transmitted between the UE 530 and one or more base stations. The timing advance measurements also may be used to determine ranging (e.g., distance) information associated with the UE 530 and the one or more base stations. However, timing advance measurements that are associated with the secondary bearer may not be performed, particularly if the ul-DataSplitThreshold 550 is not exceeded. Modifying the ul-DataSplitThreshold 550 may enable timing advance measurements to proceed on the secondary bearer even when there is insufficient UL data to transmit UL data on the secondary bearer based on the unmodified ul-DataSplitThreshold 550. The description of stages 1-4 and 7-11 of the message flow diagram 700 may be similar to the similarly numbered stages of the message flow diagram 600.

At stage 5, the UE 530 determines the bearer associated with timing advance measurements. The timing advance measurements may be performed with respect to any radio bearer, including primary and secondary bearers. In some implementations, timing advance measurements may be performed on all signal bearers used by the UE 530. Thus, at stage 4 the UE 530 may determine which, if any, radio bearer is involved with the timing advance measurements.

At stage 6, the UE 530 modifies the ul-DataSplitThreshold 550 based on the bearer associated with the timing advance measurements. For example, if the radio bearer associated with the timing advance measurement is the secondary bearer, then the UE 530 can modify the ul-DataSplitThreshold 550 to a second value that causes at least some UL data to be transmitted through the secondary bearer. In this manner, the second value of the ul-DataSplitThreshold 550 may bias UL data transmission to the radio bearer associated with the timing advance measurements. In some implementations, the timing advance measurements may be used for Enhanced Cell ID (ECID) and/or RTT determination of the position of the UE 530. Since the secondary bearer is used to transmit UL data, the timing advance measurements associated with the secondary bearer may be performed even when the amount of UL transmit data is less than the ul-DataSplitThreshold 550. Without modifying the ul-DataSplitThreshold 550, timing advance measurements associated with the secondary bearer may be delayed and only performed after the UE 530 has UL data that exceeds the first value of the ul-DataSplitThreshold 550.

Figure 8:
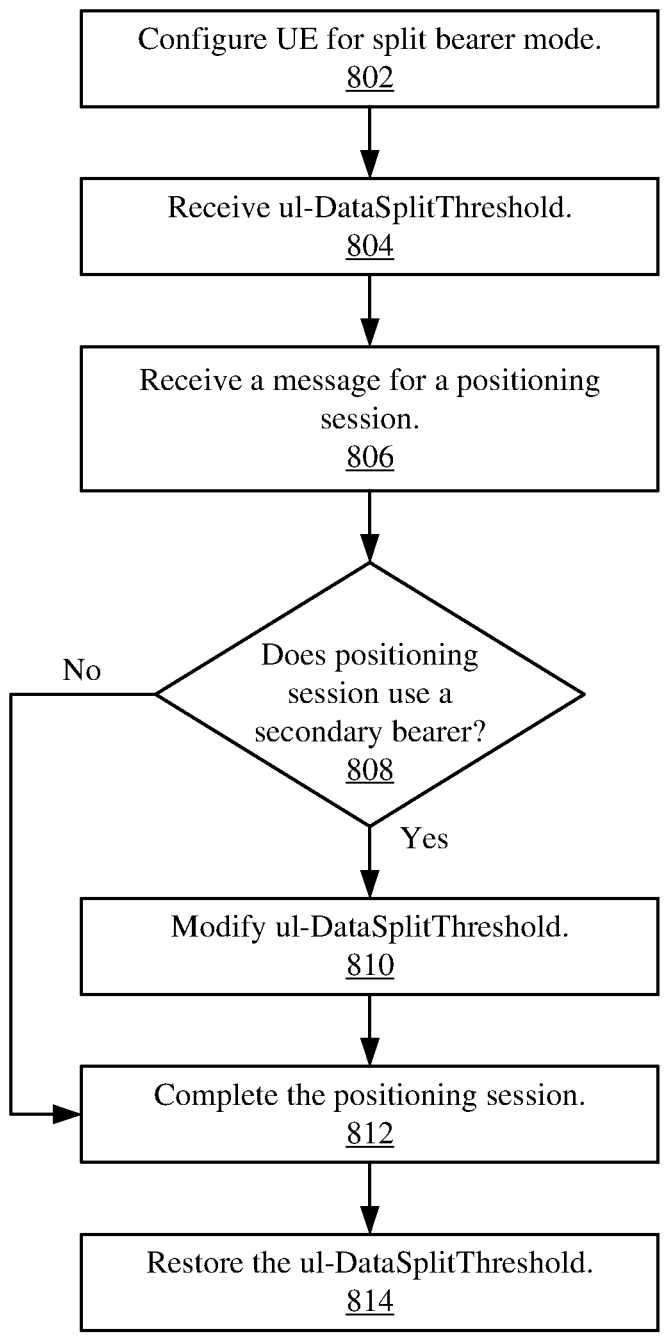
FIG. 8 shows a flowchart for an exemplary operation for supporting a positioning session of a UE within a wireless network.

FIG. 8 shows a flowchart for an example operation 800 for supporting a positioning session of a UE operating in split bearer mode within a wireless network. The operation 800 is described below with respect to the UE 530 of FIG. 5 for illustrative purposes only. The operation 800 also may be performed by the UE 104 of FIGS. 1A and 3, the UE 204 of FIGS. 2A and 2B, or any other feasible UE.

At block 802, the UE 530 is configured to operate in the split bearer mode. As described above with respect to FIG. 8, when operating in the split bearer mode, the UE 530 may concurrently transmit UL data through the first radio bearer 540 and the second radio bearer 545. In some implementations, one of the radio bearers may be designated as a primary bearer while one or more of the other radio bearers may be designated as a secondary bearer.

At block 804, the UE 530 receives the ul-DataSplitThreshold 550. The received ul-DataSplitThreshold 550 may be a first value that specifies an amount of UL data that, when exceeded, causes the UE 530 to transmit UL data on both the primary and secondary bearers. On the other hand, if the amount of UL transmit data is less than the ul-DataSplitThreshold 550, then the UE 530 may transmit UL data primarily through the primary bearer.

At block 806, the UE 530 receives a message for a positioning session. The message may direct the UE 530 to perform one or more measurements to determine the UE 530 position. At block 808, the UE 530 determines whether the secondary bearer is used during the positioning session. In some implementations, the radio bearer associated with the positioning session may be specified in the positioning session message received at block 806. In some other implementations, the UE 530 may determine which radio bearers may be involved with positioning messages used during a positioning session which may include PRS messages and/or PRS occasions. In still other implementations, the UE 530 may determine which radio bearer is scheduled to transmit UL data.

If the secondary bearer is used during the positioning session, then at block 810 the UE 530 modifies the ul-DataSplitThreshold 550 to a second value. In some implementations, the second value of the ul-DataSplitThreshold 550 may enable the UE 530 to use both the primary and secondary bearers for positioning messages. In this manner, positioning messages that use the secondary bearer may be transmitted and/or received. In some other implementations, if the radio bearer scheduled to transmit UL data is the primary bearer, then the UE 530 can modify the ul-DataSplitThreshold 550 to the second value to enable the UE 530 to use both the primary and secondary bearers for positioning messages and/or timing advance messages. In other words, the second value of the ul-DataSplitThreshold 550 may bias UL data to the radio bearer associated with advance timing measurements and/or positioning messages.

In block 812, the UE 530 completes the positioning session. For example, the UE 530 may transmit and/or receive positioning messages via the primary and secondary bearers that include PRS messages and/or PRS occasions. In some implementations, the UE 530 may perform timing advance measurements using the primary and secondary bearers. The PRS messages and information from the timing advance measurements may be used to determine the location of the UE 530.

In block 814, the UE 530 restores the ul-DataSplitThreshold 550. For example, the UE 530 may return the ul-DataSplitThreshold 550 to the first value received in block 804.

Returning to block 808, if the secondary bearer is not used during the positioning session, then the operation proceeds to block 812. Since the UE 530 does not use the secondary bearer during the positioning session, the ul-DataSplitThreshold 550 does not need to be modified and block 810 may be skipped.

Figure 9:
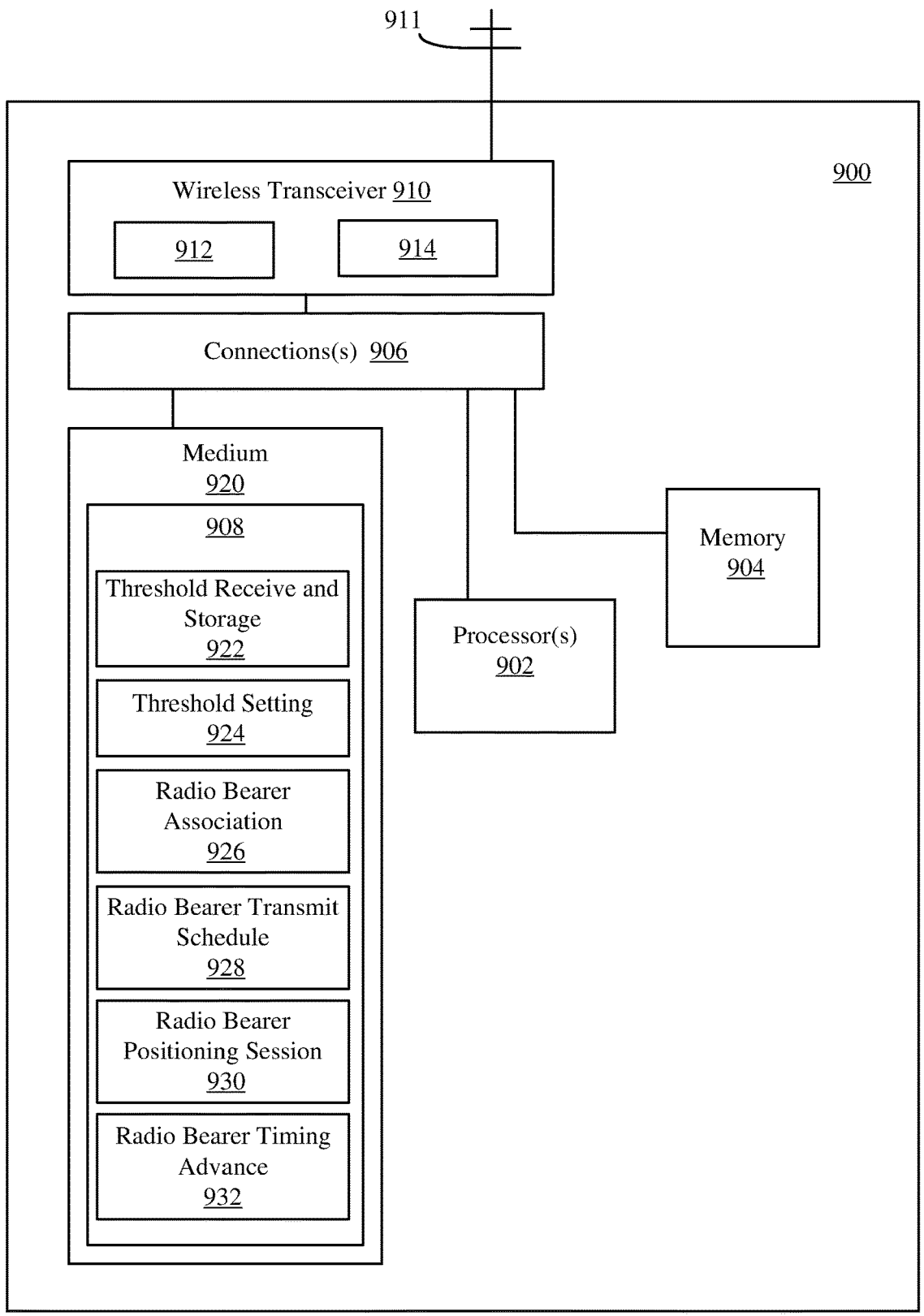
FIG. 9 shows a flowchart for another example operation for supporting a positioning session of a UE within a wireless network.

FIG. 9 shows a block diagram illustrating example features of a UE 900 that is configured to perform positioning within a wireless network. The UE 900 may be an example of the UEs 104 of FIGS. 1A and 3 and/or the UE 204 of FIGS. 2A and 2B. The UE 900 may, for example, include one or more processors 902, memory 904, an external interface such as a at least one wireless transceiver 910 (e.g., wireless network interface), which may be operatively coupled with one or more connections 906 (e.g., buses, lines, fibers, links, etc.) to a non-transitory computer readable medium 920 and memory 904. The UE 900 may further include additional items, which are not shown, such as a user interface that may include e.g., a display, a keypad or other input device, such as virtual keypad on the display, through which a user may interface with the UE. In certain example implementations, all or part of UE 900 may take the form of a chipset, and/or the like. Wireless transceiver 910 may, for example, include a transmitter 912 enabled to transmit one or more signals over one or more types of wireless communication networks and a receiver 914 to receive one or more signals transmitted over the one or more types of wireless communication networks.

In some implementations, UE 900 may include a UE antenna 911, which may be internal or external. UE antenna 911 may be used to transmit and/or receive signals processed by wireless transceiver 910. In some embodiments, UE antenna 911 may be coupled to wireless transceiver 910. In some implementations, measurements of signals received (transmitted) by UE 900 may be performed at the point of connection of the UE antenna 911 and wireless transceiver 910. For example, the measurement point of reference for received (transmitted) RF signal measurements may be an input (output) terminal of the receiver 914 (transmitter 912) and an output (input) terminal of the UE antenna 911. In a UE 900 with multiple UE antennas 911 or antenna arrays, the antenna connector may be viewed as a virtual point representing the aggregate output (input) of multiple UE antennas. In some embodiments, UE 900 may measure received signals including signal strength and TOA measurements and the raw measurements may be processed by the one or more processors 902.

The one or more processors 902 may be implemented using a combination of hardware, firmware, and software. For example, the one or more processors 902 may be configured to perform the functions discussed herein by implementing one or more instructions or program code 908 on a non-transitory computer readable medium, such as medium 920 and/or memory 904. In some embodiments, the one or more processors 902 may represent one or more circuits configurable to perform at least a portion of a data signal computing procedure or process related to the operation of UE 900.

The medium 920 and/or memory 904 may store instructions or program code 908 that contain executable code or software instructions that when executed by the one or more processors 902, cause the one or more processors 902 to operate as a special purpose computer programmed to perform the techniques disclosed herein. As illustrated in UE 900, the medium 920 and/or memory 904 may include one or more components or modules that may be implemented by the one or more processors 902 to perform the methodologies described herein. While the components or modules are illustrated as software in medium 920 that is executable by the one or more processors 902, it should be understood that the components or modules may be stored in memory 904 or may be dedicated hardware either in the one or more processors 902 or off the processors.

A number of software modules and data tables may reside in the medium 920 and/or memory 904 and be utilized by the one or more processors 902 in order to manage both communications and the functionality described herein. It should be appreciated that the organization of the contents of the medium 920 and/or memory 904 as shown in UE 900 is merely exemplary, and as such the functionality of the modules and/or data structures may be combined, separated, and/or be structured in different ways depending upon the implementation of the UE 900.

The medium 920 and/or memory 904 may include a threshold receive and storage module 922 that, when implemented by the one or more processors 902, configures the one or more processors 902 to receive via the wireless transceiver 910 the ul-DataSplitThreshold. The received ul-DataSplitThreshold may be a first value that is stored within the threshold receive and storage module 922, the memory 904, or any other feasible storage location. The ul-DataSplitThreshold may cause the UE 900 to communicate through a first radio bearer and a second radio bearer while in a split bearer mode.

The medium 920 may include a threshold setting module 924 that, when implemented by the one or more processors 902, configures the one or more processors 902 to set and/or modify the ul-DataSplitThreshold based at least in part on operating in a positioning session. In some implementations, operating in a positioning session may include receiving PRS messages and/or PRS sessions. In some implementations, execution of the threshold setting module 924 may modify the ul-DataSplitThreshold from the first value to a second value that causes the one or more processors 902 to transmit UL data through both the first and second radio bearers independent of the amount of UL data to be transmitted. In some other implementations, execution of the threshold setting module 924 may cause the one or more processors 902 to use (e.g., not release) the first and second radio bearers. In some other implementations, execution of the threshold setting module 924 may cause the one or more processors 902 to send a buffer status report (BSR), via the wireless transceiver 910, based on the setting the threshold to the second value during the positioning session on the first radio bearer and the second radio bearer for uplink scheduling. After the PRS messages are completed and/or the PRS session has ended, the one or more processors 902 may return the ul-DataSplitThreshold to the first value.

The medium 920 and/or memory 904 may include a radio bearer association module 926 that when implemented by the one or more processors 902 configures the one or more processors 902 to determine which radio bearer is associated with a positioning session. In some implementations, one of the available radio bearers may be associated with a positioning session. Thus, execution of the radio bearer association module 926 may determine which radio bearer is associated with the positioning session.

The medium 920 may include a radio bearer transit schedule module 928 that when implemented by the one or more processors 902 configures the one or more processors 902 to determine when the UE 900 is scheduled to transmit UL data. In some implementations, execution of the radio bearer transmit schedule module 928 may configure the one or more processors 902 to examine a transmit schedule associated with the UE 900 and available radio bearers.

The medium 920 may include a radio bearer positioning module 930 that when implemented by the one or more processors 902 configures the one or more processors 902 to determine that the radio bearer associated with the positioning session is different that the radio bearer on which the UE is scheduled to transmit UL data.

The medium 920 and/or memory 904 may include a radio bearer timing advance module 932 that when implemented by the one or more processors 902 configures the one or more processors 902 to determine which radio bearer is associated with timing advance related measurements.

The methodologies described herein may be implemented by various means depending upon the application. For example, these methodologies may be implemented in hardware, firmware, software, or any combination thereof. For a hardware implementation, the one or more processors 902 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 920 or memory 904 that is connected to and executed by the one or more processors 902. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 908 on a non-transitory computer readable medium, such as medium 920 and/or memory 904. Examples include computer readable media encoded with a data structure and computer readable media encoded with a computer program 908. For example, the non-transitory computer readable medium including program code 908 stored thereon may include program code 908 to support positioning of the UE 92 in split bearer mode support positioning of a UE at a specified time point with a measurement period in a manner consistent with disclosed embodiments. Non-transitory computer readable medium 920 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 908 in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer readable medium 920, instructions and/or data may be provided as signals on transmission media included in a communication apparatus. For example, a communication apparatus may include a wireless transceiver 910 having signals indicative of instructions and data. The instructions and data are configured to cause one or more processors to implement the functions outlined in the claims. That is, the communication apparatus includes transmission media with signals indicative of information to perform disclosed functions.

Memory 904 may represent any data storage mechanism. Memory 904 may include, for example, a primary memory and/or a secondary memory. Primary memory may include, for example, a random access memory, read only memory, etc. While illustrated in this example as being separate from one or more processors 902, it should be understood that all or part of a primary memory may be provided within or otherwise co-located/coupled with the one or more processors 902. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 920. As such, in certain example implementations, the methods and/or apparatuses presented herein may take the form in whole or part of a computer readable medium 920 that may include computer implementable code 908 stored thereon, which if executed by one or more processors 902 may be operatively enabled to perform all or portions of the example operations as described herein. Computer readable medium 920 may be a part of memory 904.

FIG. 10 shows a flowchart for an example operation 1000 for supporting a positioning session of a UE within a wireless network. The operation 1000 is described below with respect to the UE 900 of FIG. 9, with reference to the wireless network structure 500 of FIG. 5, and the message flow diagrams 600 and 700 of FIGS. 6 and 7, for illustrative purposes only. The operation 1000 also may be performed by the UE 104 of FIGS. 1A and 3, the UE 204 of FIGS. 2A and 2B, the UE 500 of FIG. 5, or any other feasible UE.

At block 1002, the UE 900 receives a first value for a threshold that describes an amount of uplink data that, when exceeded, causes the UE to transmit excess uplink data via the second radio bearer while the UE is in a split bearer mode, wherein the UE is configured to communicate through a first radio bearer and the second radio bearer while in the split bearer mode, e.g., as discussed in stage 2 of FIGS. 6 and 7. In some implementations, the threshold may be the ul-DataSplitThreshold 550. The received ul-DataSplitThreshold 550 may be a first value that specifies an amount of UL transmit data that, when exceeded, causes the UE 900 to transmit UL data on both the primary and secondary bearers. On the other hand, if the amount of UL transmit data is less than the ul-DataSplitThreshold 550, then the UE 900 may transmit UL data primarily through the primary bearer. A means for receiving a first value of a threshold that describes an amount of uplink data that, when exceeded, causes the UE to transmit excess uplink data via the second radio bearer while the UE is in a split bearer mode, wherein the UE is configured to communicate through a first radio bearer and the second radio bearer while in a split bearer mode may be, e.g., the wireless transceiver 910 and one or more processors 902 with dedicated hardware or implementing executable code or software instructions in memory 904 and/or medium 920 such as the threshold receive and storage module 922 in the UE 900 shown in FIG. 9.

At block 1004, the UE 900 sets the threshold to a second value when operating in a positioning session, e.g., as discussed at stage 6 of FIGS. 6 and 7. For example, the UE may set the ul-DataSplitThreshold 550 to a second value when operating in a positioning session. In some implementations, a positioning session may include the UE 900 receiving one or more positioning messages. The messages may direct the UE 900 to perform one or more measurements to determine the UE 900 position. A means for setting a threshold to a second value when operating in a positioning session may be, e.g., the one or more processors 902 with dedicated hardware or implementing executable code or software instructions in memory 904 and/or medium 920 such as the threshold setting module 924.

In one implementation, the UE 900 may determine which radio bearer is associated with the positioning session, wherein setting the threshold to the second value is in response to determining which radio bearer is associated with the positioning session, e.g., as discussed at stages 5 and 6 of FIGS. 6 and 7. For example, in some implementations, the UE 900 may determine whether the positioning session includes positioning messages associated with the secondary bearer. If the positioning messages are associated with the secondary bearer, then the UE 900 may modify the ul-DataSplitThreshold 550 to a second value such that the secondary bearer may be used to transmit and/or receive the positioning messages. In some implementations, the UE 900 may modify the ul-DataSplitThreshold 550 to enable timing advance measurements to be performed via the secondary bearer. In some other implementations, the UE 900 may modify the ul-DataSplitThreshold 550 to not release the secondary bearer during the positioning session. In this manner, the UE 900 and/or the second base station 520 may provide auxiliary information to the location server for UE assisted positioning or may be used by the UE 900 for UE based positioning. The UE 900 may restore the ul-DataSplitThreshold 550 to the first value when the positioning session is complete. In some implementations, the UE 900 may determine whether the secondary bearer is used in the positioning session prior to modifying the ul-DataSplitThreshold. For example, the UE 900 may only modify the ul-DataSplitThreshold when the secondary bearer is used for the positioning session. For example, the second value may bias transmission of the uplink data to the radio bearer associated with the positioning session. A means for determining which radio bearer is associated with the positioning session, wherein the setting the threshold to the second value is in response to determining which radio bearer is associated with the positioning session may be, e.g., the wireless transceiver 910 and one or more processors 902 with dedicated hardware or implementing executable code or software instructions in memory 904 and/or medium 920 such as the radio bearer association module 926. In some examples, the UE 900 may further determine upon which radio bearer the UE is scheduled to transmit the uplink data, wherein the setting the threshold to the second value is in response to determining upon which radio bearer the UE is scheduled to transmit the uplink data, e.g., as discussed at stages 5 and 6 of FIGS. 6 and 7. A means for determining which radio bearer the UE is scheduled to transmit UL data, may be, e.g., the wireless transceiver 910 and one or more processors 902 with dedicated hardware or implementing executable code or software instructions in memory 904 and/or medium 920 such as the radio bearer transmit schedule module 928. In some examples, the UE 900 may further determine that the radio bearer associated with the positioning session is different than the radio bearer on which the UE is scheduled to transmit the uplink data, e.g., as discussed at stages 5 and 6 of FIGS. 6 and 7. A means for determining that the radio bearer associated with the positioning session is different than the radio bearer on which the UE is scheduled to transmit the uplink data may be, e.g., the wireless transceiver 910 and one or more processors 902 with dedicated hardware or implementing executable code or software instructions in memory 904 and/or medium 920 such as the radio bearer positioning module 930.

In some implementations, the threshold may be returned to the first value after the positioning session is ended, e.g., as discussed in stage 11 of FIGS. 6 and 7. For example, the UE 900 may restore the ul-DataSplitThreshold 550 to the first value when the positioning session is complete.

In some implementations, the UE 900 may determine which radio bearer is associated with timing advance related measurements for positioning, wherein the setting the threshold to the second value is in response to determining which radio bearer is associated with the timing advance related measurements, e.g., as discussed at stage 5 of FIG. 7. The second value of the threshold, for example, may bias transmission of the uplink data to the radio bearer associated with the timing advance related measurements. The timing advance related measurements for positioning, for example, may be for Enhanced Cell ID (ECID) or Round Trip Time (RTT) position determination of the UE. A means for determining which radio bearer is associated with advance timing measurements may be, e.g., the wireless transceiver 910 and one or more processors 902 with dedicated hardware or implementing executable code or software instructions in memory 904 and/or medium 920 such as the radio bearer timing advance module 932.

In some implementations, the UE 900 may send a buffer status report (BSR) based on the setting the threshold to the second value during the positioning session on the first radio bearer and the second radio bearer for uplink scheduling, e.g., as discussed at stage 6 of FIGS. 6 and 7. A means for sending a buffer status report (BSR) based on the setting the threshold to the second value during the positioning session on the first radio bearer and the second radio bearer for uplink scheduling may be, e.g., the one or more processors 902 with dedicated hardware or implementing executable code or software instructions in memory 904 and/or medium 920 such as the threshold setting module 924.

In some implementations, the first radio bearer may be Long Term Evolution (LTE) bearer and the second radio bearer may be a New Radio (NR) bearer. The positioning session, for example, may be on the NR bearer, wherein the second value of the threshold ensures the NR bearer is not released during the positioning session.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

In view of this description embodiments may include different combinations of features. Implementation examples are described in the following numbered clauses:

Clause 1. A method performed by a user equipment (UE) for supporting a positioning session of the UE, the UE being a Dual Connectivity UE, the method comprising: receiving a first value for a threshold that describes an amount of uplink data that, when exceeded, causes the UE to transmit excess uplink data via a second radio bearer while the UE is in a split bearer mode, wherein the UE is configured to communicate through a first radio bearer and the second radio bearer while in the split bearer mode; and setting, by the UE, the threshold to a second value when operating in the positioning session.

Clause 2. The method of clause 1, wherein setting the threshold to the second value causes the UE to transmit the uplink data via the first radio bearer and the second radio bearer.

Clause 3. The method of any of clauses 1-2, further comprising: determining which radio bearer is associated with the positioning session, wherein the setting the threshold to the second value is in response to determining which radio bearer is associated with the positioning session.

Clause 4. The method of clause 3, wherein the second value biases transmission of the uplink data to the radio bearer associated with the positioning session.

Clause 5. The method of clause 3, further comprising determining upon which radio bearer the UE is scheduled to transmit the uplink data, wherein the setting the threshold to the second value is in response to determining upon which radio bearer the UE is scheduled to transmit the uplink data.

Clause 6. The method of clause 5, further comprising determining that the radio bearer associated with the positioning session is different than the radio bearer on which the UE is scheduled to transmit the uplink data.

Clause 7. The method of any of clauses clause 1-6, wherein the threshold is returned to the first value after the positioning session is ended.

Clause 8. The method of any of clauses 1-7, further comprising: determining which radio bearer is associated with timing advance related measurements for positioning, wherein the setting the threshold to the second value is in response to determining which radio bearer is associated with the timing advance related measurements.

Clause 9. The method of clause 8, wherein the second value of the threshold biases transmission of the uplink data to the radio bearer associated with the timing advance related measurements.

Clause 10. The method of clause 8, wherein the timing advance related measurements for positioning are for Enhanced Cell ID (ECID) or Round Trip Time (RTT) position determination of the UE.

Clause 11. The method of any of clauses 1-10, further comprising: sending a buffer status report (BSR) based on the setting the threshold to the second value during the positioning session on the first radio bearer and the second radio bearer for uplink scheduling.

Clause 12. The method of any of clauses 1-11, wherein the first radio bearer is Long Term Evolution (LTE) bearer and the second radio bearer is a New Radio (NR) bearer.

Clause 13. The method of clause 12, wherein the positioning session is on the NR bearer, wherein the second value of the threshold ensures the NR bearer is not released during the positioning session.

Clause 14. A user equipment (UE) configured for supporting a positioning session of the UE, the UE being a Dual Connectivity UE, comprising: a memory; a wireless transceiver; one or more processors operably coupled to the wireless transceiver and the memory, the one or more processors configured to: receive, via the wireless transceiver, a first value for a threshold that describes an amount of uplink data that, when exceeded, causes the UE to transmit excess uplink data via a second radio bearer while the UE is in a split bearer mode, wherein the UE is configured to communicate through a first radio bearer and the second radio bearer while in the split bearer mode; and set the threshold to a second value when operating in the positioning session.

Clause 15. The UE of clause 14, wherein the setting of the threshold to the second value causes the UE to transmit the uplink data via the first radio bearer and the second radio bearer.

Clause 16. The UE of any of clauses 14-15, wherein the one or more processors are further configured to: determine which radio bearer is associated with the positioning session, wherein the setting of the threshold to the second value is in response to determining which radio bearer is associated with the positioning session.

Clause 17. The UE of clause 16, wherein the second value biases transmission of the uplink data to the radio bearer associated with the positioning session.

Clause 18. The UE of clause 16, wherein the one or more processors are further configured to: determine upon which radio bearer the UE is scheduled to transmit the uplink data, wherein the one or more processors is configured to set the threshold to the second value in response to the determination upon which radio bearer the UE is scheduled to transmit the uplink data.

Clause 19. The UE of clause 18, wherein the one or more processors are further configured to: determine that the radio bearer associated with the positioning session is different than the radio bearer on which the UE is scheduled to transmit the uplink data.

Clause 20. The UE of any of clauses 14-19 wherein the threshold is returned to the first value after the positioning session is ended.

Clause 21. The UE of any of clauses 14-20, wherein the one or more processors are further configured to: determine which radio bearer is associated with timing advance related measurements for positioning, wherein the setting of the threshold to the second value is in response to determining which radio bearers is associated with the timing advance related measurements.

Clause 22. The UE of clause 21, wherein the second value of the threshold biases transmission of the uplink data to the radio bearer associated with the timing advance related measurements.

Clause 23. The UE of clause 21, wherein the timing advance related measurements for positioning are for Enhanced Cell ID (ECID) or Round Trip Time (RTT) position determination of the UE.

Clause 24. The UE of any of clauses 14-23, wherein the one or more processors are further configured to: send a buffer status report (BSR) based on the setting of the threshold to the second value during the positioning session on the first radio bearer and the second radio bearer for uplink scheduling.

Clause 25. The UE of any of clauses 14-24, wherein the first radio bearer is Long Term Evolution (LTE) bearer and the second radio bearer is a New Radio (NR) bearer.

Clause 26. The UE of clause 25, wherein the positioning session is on the NR bearer, wherein the second value of the threshold ensures the NR bearer is not released during the positioning session.

Clause 27. A non-transitory computer-readable storage medium including program code stored thereon, the program code is operable to configure at least one processor in a user equipment (UE) for supporting a positioning session of the UE, the UE being a Dual Connectivity UE, the program code comprising instructions to: receive a first value for a threshold that describes an amount of uplink data that, when exceeded, causes the UE to transmit excess uplink data via a second radio bearer while the UE is in a split bearer mode, wherein the UE is configured to communicate through a first radio bearer and the second radio bearer while in the split bearer mode; and set, by the UE, the threshold to a second value when the UE is operating in the positioning session.

Clause 28. The non-transitory computer-readable storage medium of clause 27, wherein instructions to set the threshold to the second value causes the UE to transmit the uplink data via the first radio bearer and the second radio bearer.

Clause 29. The non-transitory computer-readable storage medium of any of clauses 27-28, wherein the program code further comprises instructions to: determine which radio bearer is associated with the positioning session, wherein the setting the threshold to the second value is in response to determining which radio bearer is associated with the positioning session.

Clause 30. The non-transitory computer-readable storage medium of clause 29, wherein the second value biases transmission of the uplink data to the radio bearer associated with the positioning session.

Clause 31. The non-transitory computer-readable storage medium of clause 29, wherein the program code further comprises instructions to: determine upon which radio bearer the UE is scheduled to transmit the uplink data, wherein the instructions to set the threshold to the second value comprises instructions to set the threshold to the second value in response to determining upon which radio bearer the UE is scheduled to transmit the uplink data.

Clause 32. The non-transitory computer-readable storage medium of clause 31, wherein the program code further comprises instructions to: determine that the radio bearer associated with the positioning session is different than the radio bearer on which the UE is scheduled to transmit the uplink data.

Clause 33. The non-transitory computer-readable storage medium of any of clauses 27-32, wherein the threshold is returned to the first value after the positioning session is ended.

Clause 34. The non-transitory computer-readable storage medium of any of clauses 27-32, wherein the program code further comprises instructions to: determine which radio bearer is associated with timing advance related measurements for positioning, wherein the instructions to set the threshold to the second value comprises instructions to set the threshold to the second value in response to determining which radio bearer is associated with the timing advance related measurements.

Clause 35. The non-transitory computer-readable storage medium of clause 34, wherein the second value of the threshold biases transmission of the uplink data to the radio bearer associated with the timing advance related measurements.

Clause 36. The non-transitory computer-readable storage medium of clause 34, wherein the timing advance related measurements for positioning are for Enhanced Cell ID (ECID) or Round Trip Time (RTT) position determination of the UE.

Clause 37. The non-transitory computer-readable storage medium of any of clauses 27-36, wherein the program code further comprises instructions to: send a buffer status report (BSR) based on setting the threshold to the second value during the positioning session on the first radio bearer and the second radio bearer for uplink scheduling.

Clause 38. The non-transitory computer-readable storage medium of clause 27, wherein the first radio bearer is Long Term Evolution (LTE) bearer and the second radio bearer is a New Radio (NR) bearer.

Clause 39. The non-transitory computer-readable storage medium of clause 38, wherein the positioning session is on the NR bearer, wherein the second value of the threshold ensures the NR bearer is not released during the positioning session.

Clause 40. A user equipment (UE) configured for supporting a positioning session of the UE, the UE being a Dual Connectivity UE, comprising: means for receiving a first value for a threshold that describes an amount of uplink data that, when exceeded, causes the UE to transmit excess uplink data via a second radio bearer while the UE is in a split bearer mode, wherein the UE is configured to communicate through a first radio bearer and the second radio bearer while in the split bearer mode; and means for setting the threshold to a second value when operating in the positioning session.

Clause 41. The UE of clause 40, wherein the means for setting the threshold to the second value causes the UE to transmit the uplink data via the first radio bearer and the second radio bearer.

Clause 42. The UE of any of clauses 40-41, further comprising: means for determining which radio bearer is associated with the positioning session, wherein the setting of the threshold to the second value is in response to determining which radio bearer is associated with the positioning session.

Clause 43. The UE of clause 42, wherein the second value biases transmission of the uplink data to the radio bearer associated with the positioning session.

Clause 44. The UE of clause 42, further comprising: means for determining upon which radio bearer the UE is scheduled to transmit the uplink data, wherein the setting of the threshold to the second value is in response to determining upon which radio bearer the UE is scheduled to transmit the uplink data.

Clause 45. The UE of clause 44, further comprising: means for determining that the radio bearer associated with the positioning session is different than the radio bearer on which the UE is scheduled to transmit the uplink data.

Clause 46. The UE of any of clauses 40-45, wherein the threshold is returned to the first value after the positioning session is ended.

Clause 47. The UE of any of clauses 40-46, further comprising: means for determining which radio bearer is associated with timing advance related measurements for positioning, wherein the setting of the threshold to the second value is in response to determining which radio bearer is associated with the timing advance related measurements.

Clause 48. The UE of clause 47, wherein the second value of the threshold biases transmission of the uplink data to the radio bearer associated with the timing advance related measurements.

Clause 49. The UE of clause 47, wherein the timing advance related measurements for positioning are for Enhanced Cell ID (ECID) or Round Trip Time (RTT) position determination of the UE.

Clause 50. The UE of any of clauses 40-49, further comprising: means for sending a buffer status report (BSR) based on the setting of the threshold to the second value during the positioning session on the first radio bearer and the second radio bearer for uplink scheduling.

Clause 51. The UE of any of clauses 40-50, wherein the first radio bearer is Long Term Evolution (LTE) bearer and the second radio bearer is a New Radio (NR) bearer.

Clause 52. The UE of clause 51, wherein the positioning session is on the NR bearer, wherein the second value of the threshold ensures the NR bearer is not released during the positioning session.

Therefore, it is intended that claimed subject matter not be limited to the particular examples disclosed, but that such claimed subject matter may also include all aspects falling within the scope of appended claims, and equivalents thereof.

What is claimed is:

1. A method performed by a user equipment (UE) for supporting a positioning session of the UE, the UE being a Dual Connectivity UE, the method comprising:
   receiving a first value for a threshold that describes an amount of uplink data that, when exceeded, causes the UE to transmit excess uplink data via a second radio bearer while the UE is in a split bearer mode, wherein the UE is configured to communicate through a first radio bearer and the second radio bearer while in the split bearer mode; and
   setting, by the UE, the threshold to a second value when operating in the positioning session based on which radio bearer of the first radio bearer and the second radio bearer is associated with the positioning session.

2. The method of claim 1, wherein setting the threshold to the second value causes the UE to transmit the uplink data via the first radio bearer and the second radio bearer.

3. The method of claim 1, wherein the second value biases transmission of the uplink data to the radio bearer associated with the positioning session.

4. The method of claim 1, further comprising determining upon which radio bearer the UE is scheduled to transmit the uplink data, wherein the setting the threshold to the second value is in response to determining upon which radio bearer the UE is scheduled to transmit the uplink data.

5. The method of claim 4, further comprising determining that the radio bearer associated with the positioning session is different than the radio bearer on which the UE is scheduled to transmit the uplink data.

6. The method of claim 1, wherein the threshold is returned to the first value after the positioning session is ended.

7. The method of claim 1, further comprising:
   wherein setting the threshold to the second value is further based on which radio bearer is associated with timing advance related measurements for positioning.

8. The method of claim 7, wherein the second value of the threshold biases transmission of the uplink data to the radio bearer associated with the timing advance related measurements.

9. The method of claim 7, wherein the timing advance related measurements for positioning are for Enhanced Cell ID (ECID) or Round Trip Time (RTT) position determination of the UE.

10. The method of claim 1, further comprising:
    sending a buffer status report (BSR) based on the setting the threshold to the second value.

11. The method of claim 1, wherein the first radio bearer is Long Term Evolution (LTE) bearer and the second radio bearer is a New Radio (NR) bearer.

12. The method of claim 11, wherein the positioning session is on the NR bearer, wherein the second value of the threshold ensures the NR bearer is not released during the positioning session.

13. A user equipment (UE) configured for supporting a positioning session of the UE, the UE being a Dual Connectivity UE, comprising:
    memory;
    a wireless transceiver; and
    at least one processor operably coupled to the wireless transceiver and the memory, the at least one processor configured to:
        receive, via the wireless transceiver, a first value for a threshold that describes an amount of uplink data that, when exceeded, causes the UE to transmit excess uplink data via a second radio bearer while the UE is in a split bearer mode, wherein the UE is configured to communicate through a first radio bearer and the second radio bearer while in the split bearer mode; and
        set the threshold to a second value when operating in the positioning session based on which radio bearer of the first radio bearer and the second radio bearer is associated with the positioning session.

14. The UE of claim 13, wherein, to set the threshold to the second value, the at least one processor is configured to set the threshold to the second value to cause the UE to transmit the uplink data via the first radio bearer and the second radio bearer.

15. The UE of claim 13, wherein, to set the threshold to the second value, the at least one processor is configured to set the threshold to the second value to bias transmission of the uplink data to the radio bearer associated with the positioning session.

16. The UE of claim 13, wherein the at least one processor is further configured to:
    determine upon which radio bearer the UE is scheduled to transmit the uplink data, wherein, to set the threshold to the second value, the at least one processor is configured to set the threshold to the second value in response to the determination upon which radio bearer the UE is scheduled to transmit the uplink data.

17. The UE of claim 16, wherein the at least one processor is further configured to:
    determine that the radio bearer associated with the positioning session is different than the radio bearer on which the UE is scheduled to transmit the uplink data.

18. The UE of claim 13, wherein the at least one processor is further configured to:
    return the threshold to the first value after the positioning session is ended.

19. The UE of claim 13, wherein the at least one processor is further configured to:
    determine which radio bearer is associated with timing advance related measurements for positioning, wherein, to set the threshold to the second value, the at least one processor is configured to set the threshold to the second value in response to the determination upon which radio bearers is associated with the timing advance related measurements.

20. The UE of claim 19, wherein, to set the threshold to the second value, the at least one processor is configured to set the threshold to the second value to bias transmission of the uplink data to the radio bearer associated with the timing advance related measurements.

21. The UE of claim 19, wherein the timing advance related measurements for positioning are for Enhanced Cell ID (ECID) or Round Trip Time (RTT) position determination of the UE.

22. The UE of claim 13, wherein the at least one processor is further configured to:
send a buffer status report (BSR) based on the setting of the threshold to the second value.

23. The UE of claim 13, wherein the first radio bearer is a Long Term Evolution (LTE) bearer and the second radio bearer is a New Radio (NR) bearer.

24. The UE of claim 23, wherein the positioning session is on the NR bearer, wherein the second value of the threshold ensures the NR bearer is not released during the positioning session.

25. A non-transitory computer-readable storage medium including program code stored thereon, the program code is operable to configure at least one processor in a user equipment (UE) for supporting a positioning session of the UE, the UE being a Dual Connectivity UE, the program code comprising instructions to:
receive a first value for a threshold that describes an amount of uplink data that, when exceeded, causes the UE to transmit excess uplink data via a second radio bearer while the UE is in a split bearer mode, wherein the UE is configured to communicate through a first radio bearer and the second radio bearer while in the split bearer mode; and
set, by the UE, the threshold to a second value when the UE is operating in the positioning session based on which radio bearer of the first radio bearer and the second radio bearer is associated with the positioning session.

26. A user equipment (UE) configured for supporting a positioning session of the UE, the UE being a Dual Connectivity UE, comprising:
means for receiving a first value for a threshold that describes an amount of uplink data that, when exceeded, causes the UE to transmit excess uplink data via a second radio bearer while the UE is in a split bearer mode, wherein the UE is configured to communicate through a first radio bearer and the second radio bearer while in the split bearer mode; and
means for setting the threshold to a second value when operating in the positioning session based on which radio bearer of the first radio bearer and the second radio bearer is associated with the positioning session.

* * * * *